United States Patent
Kato et al.

(10) Patent No.: US 6,268,452 B1
(45) Date of Patent: Jul. 31, 2001

(54) PROCESS FOR THE PRODUCTION OF ALLYLAMINE POLYMER

(75) Inventors: Tadashi Kato; Yasuhito Nakata; Tadao Endo; Ikuo Hayashi, all of Koriyama (JP)

(73) Assignee: Nitto Boseki Co., Ltd., Fukushima-ken (JP)

( * ) Notice: Subject to any disclaimer, the term of this patent is extended or adjusted under 35 U.S.C. 154(b) by 0 days.

(21) Appl. No.: 09/291,029

(22) Filed: Apr. 14, 1999

(30) Foreign Application Priority Data

Apr. 17, 1998 (JP) .................................. 10-122739
May 28, 1998 (JP) .................................. 10-162772
Jun. 11, 1998 (JP) .................................. 10-178009

(51) Int. Cl.[7] .................................................... C08F 12/28
(52) U.S. Cl. ...................... 526/310; 526/217; 526/218.1; 526/219; 526/219.1
(58) Field of Search ............................ 526/219, 219.1, 526/218.1, 217, 310

(56) References Cited

U.S. PATENT DOCUMENTS

| 3,062,798 | 11/1962 | Lovett . | |
|---|---|---|---|
| 4,053,512 | 10/1977 | Panzer et al. . | |
| 4,329,441 | * 5/1982 | Bergthaller | ............ 526/193 |
| 4,528,347 | * 7/1985 | Harada et al. | ............ 526/219 |
| 4,838,896 | * 6/1989 | Kissling et al. | ............ 8/554 |

FOREIGN PATENT DOCUMENTS

| 29 46 550 A1 | 11/1979 | (DE) . |
| 58-201811 | 11/1983 | (JP) . |
| 60-108405 | 6/1985 | (JP) . |
| 61-179211 | 8/1986 | (JP) . |
| 2-14364 | 4/1990 | (JP) . |
| 2-80681 | 3/1996 | (JP) . |

OTHER PUBLICATIONS

Zykova et al: *Chem. Abstr.* 61, 14855 (1964), Tr. Inst. Khim. KauK, Akad, Nauk. Kaz. SSR –89–94 (1964).
Kavanov et al, Vysokomol, Soed, 18(9), 1957 (1976).

* cited by examiner

*Primary Examiner*—David W. Wu
*Assistant Examiner*—Ling-Siu Choi
(74) *Attorney, Agent, or Firm*—Nixon & Vanderhye

(57) ABSTRACT

Provided is an industrially advantageous process for producing allylamine polymers from various allylamines in an organic solvent with ease and at high yields, and the process comprises polymerizing allylamines in a medium containing an organic solvent in the presence of an azo compound selected from azo compounds of the formulae (I) and (II),

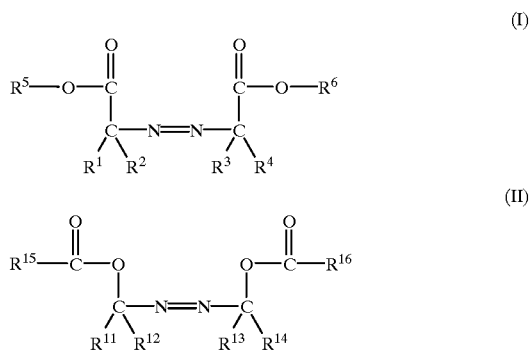

wherein symbols are as defined in the specification.

8 Claims, 14 Drawing Sheets

US 6,268,452 B1

PROCESS FOR THE PRODUCTION OF ALLYLAMINE POLYMER

FIELD OF THE INVENTION

The present invention relates to a novel process for the production of an allylamine polymer. More specifically, it relates to a process for the production of an allylamine polymer, in which an allylamine polymer useful for various purposes in the field of fine chemicals can be industrially advantageously produced in an organic solvent.

PRIOR ART OF THE INVENTION

A monoallylamine polymer is a linear olefin polymer having a side chain containing a primary amino group, and it is a cationic polymer compound which is well soluble in water and is positively chargeable. The above monoallylamine polymer has characteristic reactive polymer structure and properties, and is therefore remarkably widely used in fields of dye fixing agents for reactive dyes, dye fixing agents for direct dyes, additives for inkjet recording sheets, and the like.

Concerning the production of the above monoallylamine polymer, the following production methods are known.

(1) A method in which a monoallylamine polymer is obtained by a gas-phase polymerization using tetrafluorohydrazine as a catalyst (U.S. Pat. No. 3,062,798).

(2) A method in which a small amount of water is added to monoallylamine hydrochloride, the mixture is brought into a dissolved state at 80 to 85° C., and hydrogen peroxide is little by little added to obtain a monoallylamine hydrochloride polymer (V. V. Zykova, et al., Tr. Inst. Khim. NauK, Akad. Nauk. Kaz. SSR 89-94 (1964), Chem. Abstr., 61, 14855 (1964))

(3) A method in which a monoallylamine hydrochloride is dissolved in a tert-butyl alcohol-chlorobenzene mixed solvents in the co-presence of diethylphosphite, and the monoallylamine hydrochloride is polymerized in the presence of azobisisobutyronitrile as an initiator at a reflux temperature of the solvents (German Laid-open Patent Publication No. 2 946 550).

(4) A method in which a monoallylamine is polymerized in a protonic acid (phosphoric acid, sulfuric acid, hydrochloric acid) by irradiation with gamma ray or with ultraviolet ray in the co-presence of hydrogen peroxide (V. A. Kavanov, et al., Vysokomol, Soed, 18(9), 1957 (1976)).

(5) A method in which an inorganic acid salt of a monoallylamine is polymerized in a polar solvent in the presence of a radical polymerization initiator having a molecule containing an azo group and cationic nitrogen (e.g., JP-A-58-201811 and JP-B-2-14364).

Of the above methods, clearly, the methods (1) to (4) cannot be said to be practical since they are difficult to carry out industrially or a polymerization solution is extremely colored. The above method (5) is practiced in industry. Generally, water is used as a polar solvent, and when the above method (5) is carried out in an organic solvent, the yield from the polymerization decreases, and it has not been industrially carried out in an organic solvent.

Practically at present, there is known no simple practical method of producing a monoallylamine polymer in an organic solvent.

An N,N-dialkylallylamine polymer is considered a remarkably interesting practical polymer as compared with the above monoallylamine polymer. As described in Comparative Example 12 on pages 8 and 9 of JP-B-2-14364, even polymerization of a monomer such as N,N-dimethylallylamine in the presence of a radical polymerization initiator having a molecule containing an azo group and cationic nitrogen can give only a trace amount (yield 5%) of a polymer, and no reports have said that N,N-dialkylallylamine polymer can be obtained at high yields by polymerization in the presence of a radical polymerization initiator including other polymerization initiators.

As a method for producing N,N-dialkylallylamine polymer, there are known only methods in which some polymer other than the N,N-dialkylallylamine polymer is used as a starting material and substituents of side chain of the polymer are chemically converted to obtain an N,N-dialkylallylamine polymer. Among them is a method of producing N,N-dialkylallylamine polymer in which poly(N,N-dialkylacrylamide) such as poly(N,N-dimethylacrylamide) is reacted with sodium-bis(2-methoxyethoxy)aluminum hydride (U.S. Pat. No. 4,053, 512). However, the defect of the above method is that a special reducing agent is used, and so it is difficult to industrially produce the intended polymer. There is another method of producing N,N-dialkylallylamine polymer, in which formic acid and formaldehyde are reacted with a polyallylamine to produce N,N-dimethylallylamine polymer (JP-A-60-108405). This method cannot necessarily be said to be satisfactory since two-step reactions are required for obtaining the end product from a monoallylamine as a starting material.

As described above, it is considered that N,N-dialkylallylamine itself does not easily undergo polymerization. In reality, further, no reports have said that copolymers of N,N-dialkylallylamine and allylamines are produced by polymerization.

Concerning N-monoalkylallylamine polymer, JP-A-61-179211 and JP-A-2-80681 describe the production thereof by polymerizing N-monoalkylallylamine hydrochloride in an aqueous solution in the presence of a specific radical polymerization initiator having a molecule containing an azo group and cationic nitrogen. However, almost no polymerization in an organic solvent is known.

Meanwhile, if industrial polymerization of allylamines in an organic solvent is feasible, it is considered that an anhydrous allylamine polymer can be easily obtained and is therefore useful in the field of hydrophobic applications or for using it in an anhydrous reaction.

SUMMARY OF THE INVENTION

Under the circumstances, it is an object of the present invention to provide a process for industrially advantageously producing allylamine polymers from various allylamines as raw materials in an organic solvent with ease at high yields.

For achieving the above object, the present inventors had made diligent studies and as a result have found that the above object can be achieved by polymerizing addition salts of various allylamines in a medium containing an organic solvent in the presence of a radical polymerization initiator which is a specific azo compound. The present invention has been completed on the basis of the above finding.

That is, according to the present invention, the above object of the present invention is achieved by a process for the production of an allylamine polymer, which comprises polymerizing an addition salt of at least one selected from allylamines in a medium containing an organic solvent in the presence of at least one radical polymerization initiator selected from an azo compound of the general formula (I),

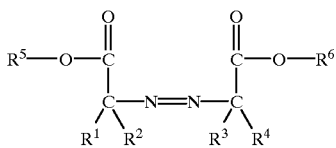

(I)

wherein each of $R^1$ to $R^4$ is independently a hydrocarbon group, provided that $R^1$ and $R^2$ may bond to each other to form a ring and that $R^3$ and $R^4$ may bond to each other to form a ring, and each of $R^5$ and $R^6$ is independently an alkyl group,
and an azo compound of the general formula (II),

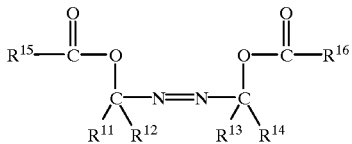

(II)

wherein each of $R^{11}$ to $R^{14}$ is independently a hydrocarbon group, provided that $R^{11}$ and $R^{12}$ may bond to each other to form a ring and that $R^{13}$ and $R^{14}$ may bond to each other to form a ring, and each of $R^{15}$ and $R^{16}$ is independently a hydrogen atom or an alkyl group.

Specifically, according to the present invention, there are provided;

(1) a process for the production of an allylamine polymer, which comprises polymerizing a monoallylamine addition salt,
(2) a process for the production of an allylamine polymer, which comprises polymerizing an N,N-dialkylallylamine addition salt,
(3) a process for the production of an allylamine polymer, which comprises copolymerizing an N,N-dialkylallylamine addition salt and an addition salt of at least one selected from a monoallylamine, an N-monoalkylallylamine and a dialylamine.
(4) a process for the production of an allylamine polymer, which comprises polymerizing an N-monoalkylallylamine addition salt,
(5) a process for the production of an allylamine polymer, which comprises copolymerizing an N-monoalkylallylamine addition salt and an addition salt of at least one selected from a monoallylamine and a diallylamine.
(6) a process for the production of an allylamine polymer, which comprises polymerizing an addition salt of diallylamines, and
(7) a process for the production of an allylamine polymer, which comprises copolymerizing an addition salt of an diallylamine and a monoallyl amine addition salt.

DETAILED DESCRIPTION OF THE INVENTION

Figure 1:
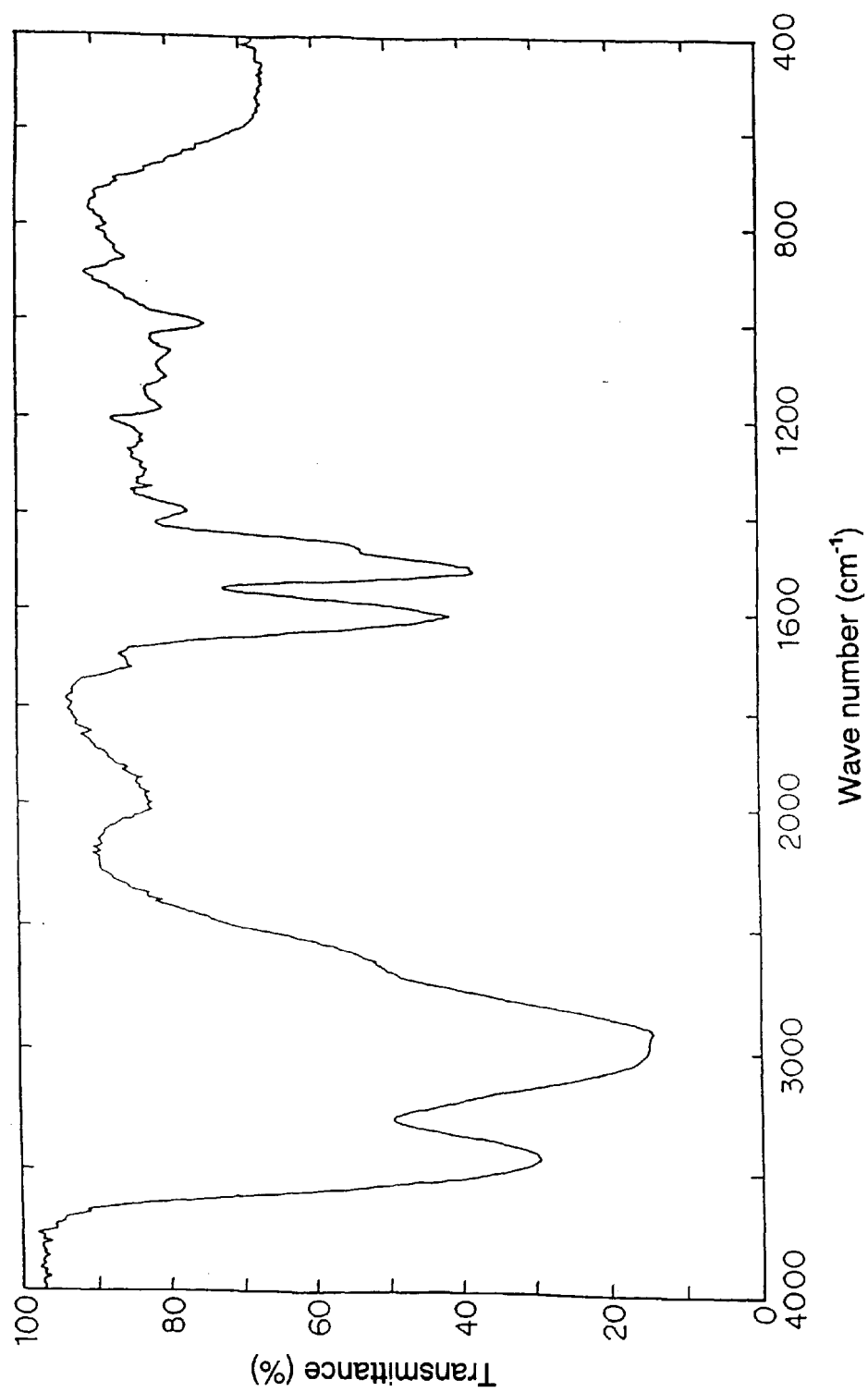
FIG. 1 is an IR spectrum of a monoallylamine hydrochloride polymer obtained in Example 1.

In the process for the production of an allylamine polymer, provided by the present invention, the polymerization is carried out in a medium containing an organic solvent.

The above organic solvent is preferably selected from organic solvents having high polarity (polar organic solvents). Specific examples of the organic solvent include methanol, ethanol, n-propanol, isopropanol, N,N-dimethylformamide, N,N-dimethylacetamide, dimethylsulfoxide, formamide, ethylene glycol, N-methylpyrrolidone, hexamethylphosphoric acid triamide, 1,3-dipropylimidazolidinone and tetramethylurea. These organic solvents may be used alone or in combination.

In the process of the present invention, a compound of the general formula (I) or (II),

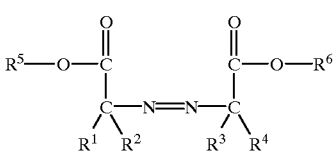

(I)

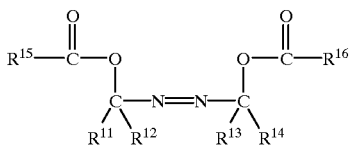

is used as a radical polymerization initiator.

In the above general formula (I), each of $R^1$ to $R^4$ is a hydrocarbon group, preferably an alkyl group having 1 to 4 carbon atoms, and each of these substituents may be the same as, or different from, every other one. Further, $R^1$ and $R^2$ may bond to each other to form a ring, and $R^3$ and $R^4$ may bond to each other to form a ring. In view of an easiness in synthesis, preferably, $R^1$ and $R^3$ are the same as each other, and $R^2$ and $R^4$ are the same as each other. Each of $R^5$ and $R^6$ is an alkyl group, preferably an alkyl group having 1 to 4 carbon atoms, and these substituents may be the same as, or different from, each other. In view of an easiness in synthesis, preferably, $R^5$ and $R^6$ are the same as each other.

Examples of the azo compound of the general formula (I) include 2,2'-azobis(methyl 2-methylpropionate) [$R^1=R^2=R^3=R^4=CH_3$ and $R^5=R^6=CH_3$ in the general formula (I)], 2,2'-azobis(ethyl 2-methylpropionate) [$R^1=R^2=R^3=R^4=CH_3$ and $R^5=R^6=C_2H_5$ in the general formula (I)], 2,2'-azobis (methyl 2-methylbutyrate) [$R^1=R^3=CH_3$, $R^2=R^4=C_2H_5$ and $R^5=R^6=CH_3$ in the general formula (I)], and 2,2'-azobis (ethyl 2-methylbutyrate) [$R^1=R^3=CH_3$, $R^2=R^4=C_2H_5$ and $R^5=R^6=C_2H_5$ in the general formula (I)].

In the above general formula (II), each of $R^{11}$ to $R^{14}$ is a hydrocarbon group, preferably an alkyl group having 1 to 4 carbon atoms, and these substituents may be the same as, or different from each other. $R^{11}$ and $R^{12}$ may bond to each other to form a ring, and $R^{13}$ and $R^{14}$ may bond to each other to form a ring. Further, in view of an easiness in synthesis, $R^{11}$ and $R^{13}$ are the same as each other, and $R^{12}$ and $R^{14}$ are the same as each other. Each of $R^{15}$ and $R^{16}$ is a hydrogen atom or an alkyl group, preferably an alkyl group having 1 to 4 carbon atoms, and these substituents may be the same as, or different from, each other. In view of an easiness in synthesis, $R^{15}$ and $R^{16}$ are preferably the same as each other.

Examples of the azo compound of the general formula (II) include 2,2'-azobis(2-acetoxypropane) [$R^{11}=R^{12}=R^{13}=R^{14}=CH_3$ and $R^{15}=R^{16}=CH_3$ in the general formula (II)], 2,2'-azobis(2-acetoxybutane) [$R^{11}=R^{13}=CH_3$, $R^{12}=R^{14}=C_2H_5$ and $R^{15}=R^{16}=CH_3$ in the general formula (II)], and 1,1'-azobis(1-formoxycyclohexane) [$R^{11}$ and $R^{12}$ bond to each other to be —$(CH_2)_5$— and forms a ring, $R^{13}$ and $R^{14}$ bond to each other to be —$(CH_2)_5$— and forms a ring, and $R^{15}=R^{16}=H$ in the general formula (II)].

In the present invention, the above azo compounds may be used alone or in combination as a radical polymerization initiator, and 2,2'-azobis(methyl 2-propionate) is particularly preferred. The radical polymerization initiator does not particularly require the co-presence of an inorganic salt such as zinc chloride.

As described above, the radical polymerization initiator used in the present invention has a characteristic feature in that it is a specific nonionic radical polymerization initiator containing an azo group. It is very difficult to infer on the basis of conventional technology level that the above radical polymerization initiator can be applied to the production of an allylamine polymer, as will be described below.

(1) As already described, a polymer can be easily obtained by polymerizing an inorganic acid of a monoallylamine in a polar solvent in the presence of an azo radical initiator having a molecule containing a group having a cationic nitrogen atom (JP-B-2-14364). However, Japanese Patent Publication No. JP-B-2-14364 describes that, as a condition of easily carrying out the polymerization of an inorganic acid salt of a monoallylamine, "it is essential for both the monomer and the initiator to have charges in a polymerization system". In this case, it is clear from claims that "charge" of the initiator refers to an anodic charge of a cationic nitrogen atom.

(2) JP-B-2-57082, column 5, lines 7 to 9 describes that when monoalylamine hydrochloride is polymerized in an aqueous solution in the presence of a nonionic radical polymerization initiator used in the present invention, no effect can be obtained without the co-presence of an inorganic salt such as zinc chloride. In this case, nothing is described concerning polymerization in the presence of an organic solvent.

(3) As a nonionic radical polymerization initiator containing an azo group, azobisisobutyronitrile (AiBN) is generally used for production of various polymers by polymerization, while the use of the other nonionic radical polymerization initiator in the reaction system of the present invention can give almost no effect, as will be described later in Comparative Example.

It is therefore particularly surprising that the use of the nonionic radical polymerization initiator in the present invention shows remarkable effects in the polymerization system of the present invention.

In the process of the present invention, an addition salt of an allylamine is used as a monomer. The allylamine includes a monoallylamine, an N-N-dialkylallylamine, an N-monoalkylallylamine and a diallylamine. Although not specially limited, the addition salt includes, for example, hydrochloride, sulfate, sulfite, hydrobromide, phosphate, acetate, methanesulfonate, trifluoroacetate and p-toluenesulfonate. The above addition salts of the allylamines may be used alone or in combination.

In the polymerization, the addition salt of an allylamine is generally used in the form of an isolated crystal, while the addition salt of an allylamine may be formed by adding the allylamine and an acid to the above medium. Needless to say that a predetermined amount of an allylamine can be added to a medium and directly polymerized when an acidic organic solvent such as acetic acid is used as a medium for the polymerization. In the present invention, the molecular weight of the obtained polymer differs depending upon a medium used. Generally, when an aprotic polar solvent such as N,N-dimethylformamide, N,N-dimethylacetamide or dimethylsulfoxide is used as a medium, the above molecular weight tends to be high.

The process for the production of an allylamine polymer, provided by the present invention, specifically includes the following processes (1) a process of polymerizing a monoallylamine addition salt, (2) a process of polymerizing an N,N-dialkylallylamine addition salt, (3) a process of copolymerizing (A) an N,N-dialkylallylamine addition salt and (B) an addition salt of at least one selected from a monoallylamine, an N-monoalkylallylamine and diallylamines, (4) a process of polymerizing an N-monoalkylallylamine addition salt, (5) a process of copolymerizing (C) an N-monoalkylallylamine addition salt and (D) an addition salt of at least one selected from a monoallylamine and a diallylamine, (6) a process of polymerizing an addition salt of a diallylamine, and (7) a process of copolymerizing (E) an addition salt of a diallylamine and (F) a monoallylamine addition salt.

Although not specially limited, the N,N-dialkylallylamine constituting the N,N-dialkylallylamine addition salt used in the above processes (2) and (3) preferably has the general formula (III),

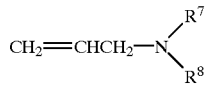
(III)

wherein each of $R^7$ and $R^8$ is independently an alkyl group having 1 to 10 carbon atoms. In this case, more preferably, each of $R^7$ and $R^8$ is independently an alkyl group having 1 to 4 carbon atoms. Specifically, the N,N-dialkylallylamine is preferably selected from N,N-dimethylallylamine, N-methyl-N-ethylallylamine, N,N-diethylallylamine, N,N-dipropylallylamine or N,N-dibutylallylamine.

Although not specially limited, the N-monoalkylallylamine constituting the N-monoalkylallylamine addition salt used in the above processes (3), (4) and (5) preferably has the general formula (IV),

(IV)

wherein $R^9$ is an alkyl group having 1 to 10 carbon atoms. Specifically, the N-monoalkylallylamine is preferably selected from N-methylallylamine, N-ethylallylamine, N-propylallylamine, N-butylallylamine, or the like.

The diallylamine addition salt used in the above processes (3), (5), (6) and (7) includes the above addition salts or quaternary ammonium salt of a compound of the general formula (V),

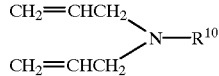
(V)

wherein $R^{10}$ is a hydrogen atom or an alkyl group having 1 to 10 carbon atoms, which alkyl group may have a hydroxyl group. Of the alkyl groups represented by $R^{10}$, the alkyl group which may have a hydroxyl group is preferably an alkyl group having 1 to 4 carbon atoms, which alkyl group may have a hydroxyl group.

Examples of the addition salt of the above diallylamine preferably include the above addition salts of a non-substituted diallylamine (to be sometimes simply referred to as "diallylamine" hereinafter), N-methyldiallylamine, N-ethyldiallylamine, N-propyldiallylamine, N-(2-hydroxyethyl)diallylamine, N-(2-hydroxypropyl)diallylamine or N-(3-hydroxypropyl)diallylamine and quaternary ammonium salts such as N,N-dimethyldiallylammonium chloride, N,N-diethyldiallylammonium chloride, N,N-dipropyldiallylammonium chloride and N,N-dibutyldiallylammonium chloride.

In the above processes (3), (5) and (7), the amount ratio of a monomer as component (A) and a monomer as component (B), the amount ratio of a monomer as component (C) and a monomer as component (D) and the amount ratio of a monomer as component (E) and a monomer as component (F) are not specially limited. Generally, however, each of the above amount ratios is preferably in the range of from 9:1 to 1:9.

In the process of the present invention, the polymerization according to any one of the above processes (1) to (7) is carried out in a medium containing an organic solvent in the presence of the radical polymerization initiator, to produce an allylamine polymer. The amount of the radical polymerization initiator based on the total amount of addition salts of allylamines is generally at least 1 mol %, preferably 2 to 50 mol %, more preferably 4 to 40 mol %, particularly preferably 4 to 20 mol %.

The temperature for the polymerization differs depending upon a medium used for the polymerization, while it is generally 20° C. to a reflux temperature, preferably 30° C. to 100° C., more preferably 40° C. to 90° C.

The time period for the polymerization cannot be generally determined since it is affected by a polymerization temperature, the kind and amount of a radical polymerization initiator, and the like. Generally, however, the polymerization is completed sufficiently within 200 hours.

It is preferred that the concentration of starting monomer(s) should be high within the range of the solubility thereof, and in this case, the yield and the molecular weight of a polymer tend to be high. The concentration of the starting monomer(s) is generally at least 15% by weight, preferably 20 to 90% by weight.

When a polymer of an allylamine addition salt is precipitated in a polymerization solution after the polymerization, the precipitate is recovered by filtration to obtain a polymer as a solid. When a polymerization solution is a uniform solution, the polymerization solution is poured into a precipitating solvent to form a precipitate, and a solid as the precipitate is recovered by means of filtration, and the like.

When an organic solvent alone is used as a medium in the present invention, an anhydrous allylamine polymer as an end product can be obtained.

When an inorganic acid salt is used as an addition salt for a monomer as a raw material, a precipitating solvent such as methanol or acetone is added to a reaction mixture after the polymerization, a precipitated addition salt polymer is recovered by filtration, a small amount of methanol is added to the polymer, then, a solution of a metal alkoxide such as sodium methoxide is added, and a precipitated inorganic salt, e.g., sodium chloride is recovered by means of filtration, and the like. In this manner, a solution of a free allylamine polymer in the organic solvent, from which the addition salt is removed, can be easily obtained.

Further, when a derivative of an allylamine polymer is conventionally produced by reacting an allylamine polymer with an organic reagent (e.g., acrylonitrile or allyl glycidyl ether) in an organic solvent as described in JP-A-60-106801 and JP-A-62-256801, it is required to purify and dry a polymer of an allylamine inorganic acid salt after polymerization of the allylamine inorganic acid salt, for obtaining the allylamine polymer as a raw material, and complicated procedures are required. In contrast, the present invention can easily give a solution of an allylamine polymer in an organic solvent and is therefore advantageous for producing the derivative of an allylamine polymer. The above solution of a free allylamine polymer in the organic solvent is effective for use as a raw material for the above reaction in an organic solvent.

EXAMPLES

The present invention will be explained more in detail with reference to Examples hereinafter, while the present invention shall not be limited by these Examples.

Abbreviations

MAIB: 2,2'-azobis(methyl 2-methylpropionate)

GPC: gel permeation chromatography

IR spectrum: infrared absorption spectrum

NMR spectrum: nuclear magnetic resonance spectrum

Weight average molecular weight

A polymer was measured for a weight average molecular weight according to a GPC method with a Hitachi L-6000 high-performance liquid chromatograph. A Hitachi L-6000 was used as an eluant flow-line pump. A Shodex RI SE-61 differential refractive index detector was used as a detector. A combination of Asahi Pack water-based gel filtration type GS-220HQ (exclusion-limit molecular weight 3,000) and GS-620HQ (exclusion-limit molecular weight 2,000,000) was used as columns. A sample was prepared by dissolving 0.5 g/100 ml of a polymer in an eluant, and 20 µl of the sample was used. An aqueous solution containing 0.4 mol/liter of sodium chloride was used as an eluant. The measurement was carried out at a column temperature of 30° C. at a flow rate of 1.0 ml/minute. As standard samples, 10 kinds of polyethylene glycol samples having molecular weights of 106, 194, 440, 600, 1,470, 4,100, 7,100, 10,300, 12,600 and 23,000 were used, to prepare a calibration curve, and a weight average molecular weight of the polymer was determined on the basis of the calibration curve.

Example 1

Preparation of Monoallylamine Hydrochloride Polymer by Using Methanol as Polymerization Medium A one-liter four-necked round-bottom separable flask having a stirrer, a thermometer and a Dimroth reflux condenser (with a calcium tube in which silica gel is sealed) was charged with methanol, and 156.8 g (4.30 mol) of hydrogen chloride was introduced to obtain a methanol solution of hydrogen chloride. The methanol solution was cooled, and 240.1 g (4.20 mol) of monoallylamine was dropwise added thereto. A methanol solution containing the resultant monoallylamine hydrochloride at a monomer concentration of 50% by weight was maintained at 50° C., and 29.1 g (3 mol % based on the monomer) of MAIB was added as a radical polymerization initiator. Further, 24 hours after the polymerization was initiated, 29.1 g of MAIB was again added. The polymerization was carried out at 50° C. for a total time period of 48 hours. Each time when the polymerization initiator was added, heat generation was small, and the temperature was increased by 2° C. or smaller.

Figure 2:
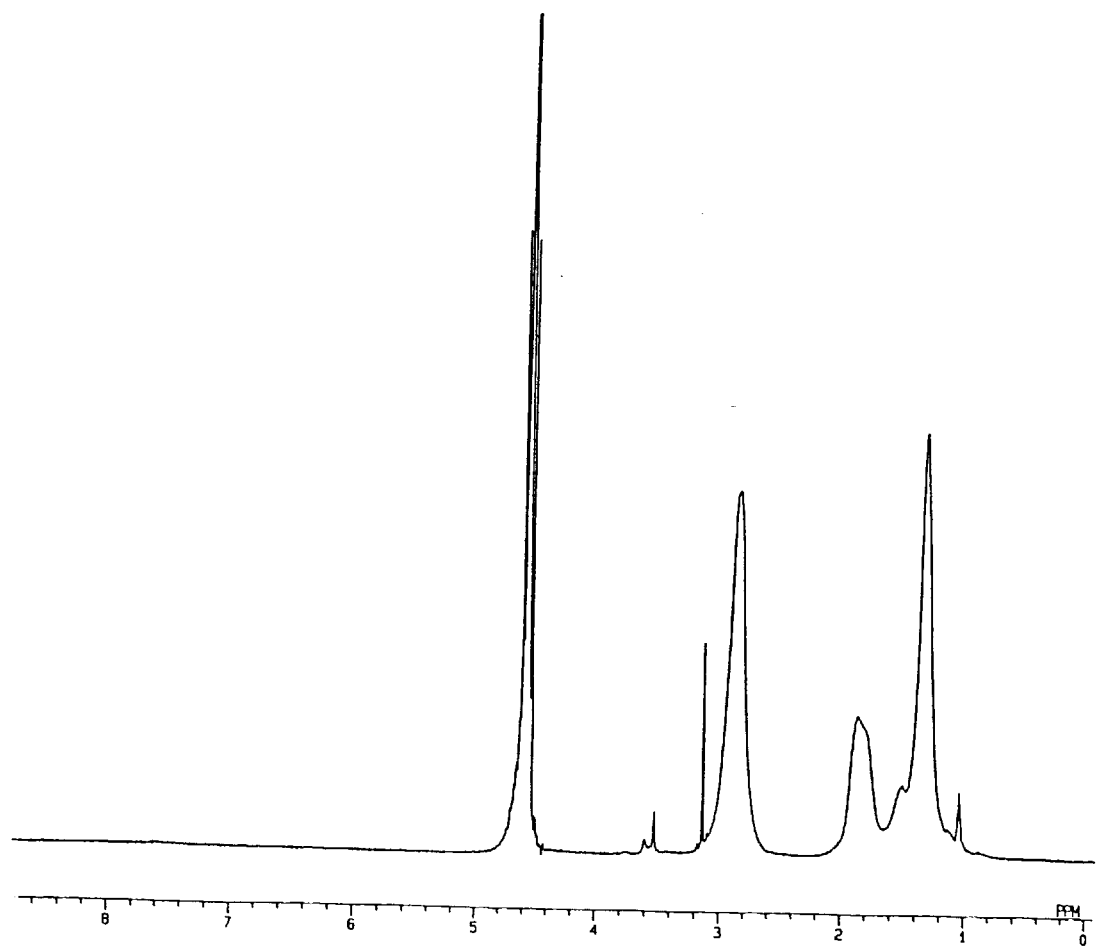
FIG. 2 is an NMR spectrum ($D_2O$ solvent) of the monoallylamine hydrochloride polymer obtained in Example 1.
Figure 3:
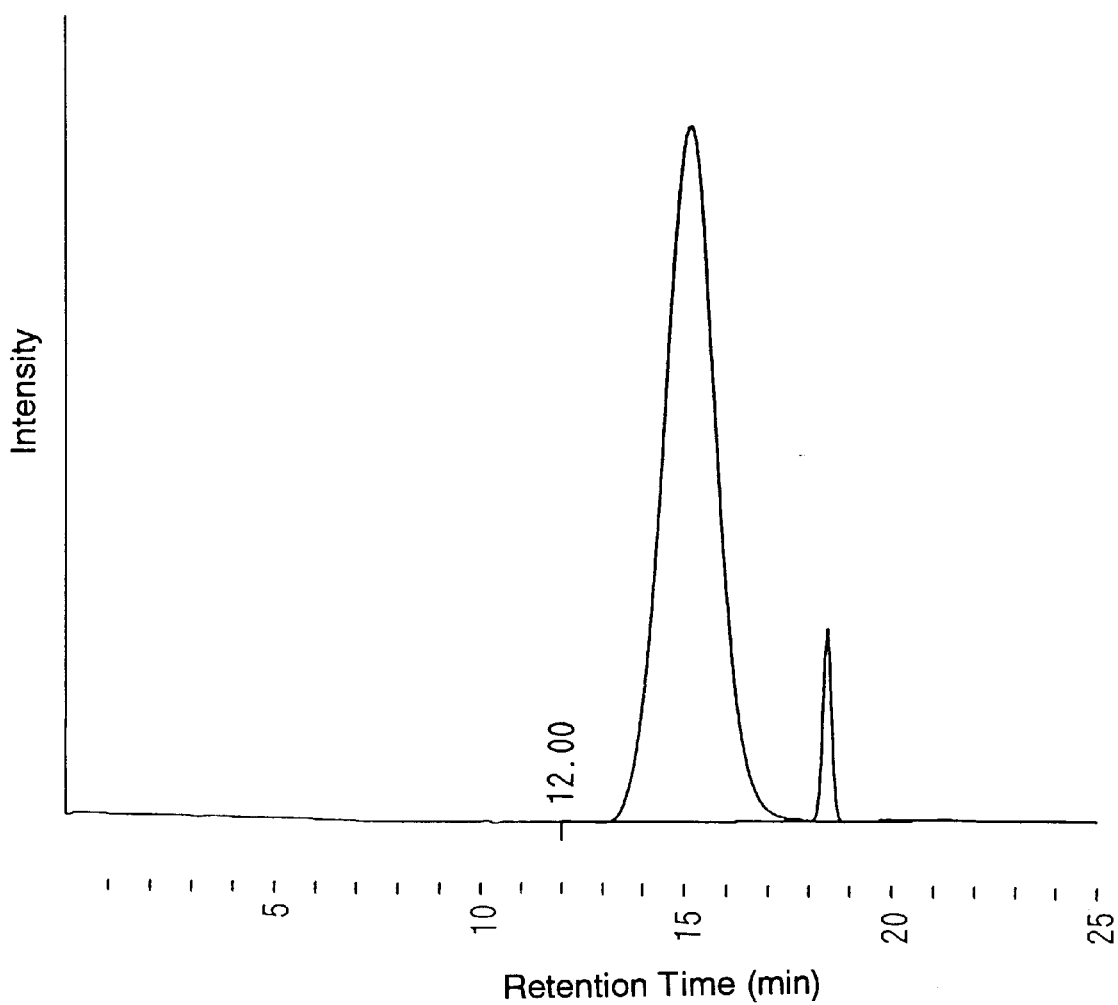
FIG. 3 is a molecular weight distribution of the monoallylamine hydrochloride polymer obtained in Example 1, prepared by GPC.

The reaction system was solidified and it was therefore difficult to stir the same. Methanol was added, and a solid was pulverized, then recovered by filtration and dried under vacuum at 60° C. for 72 hours to give 359.0 g (isolation yield 91%) an anhydrous monoallylamine hydrochloride polymer in the form of a powder. FIGS. 1, 2 and 3 show the results of an IR spectrum, an NMR spectrum and a GPC of the obtained monoallylamine hydrochloride polymer. The IR spectrum and the NMR spectrum support that the obtained polymer was a monoallylamine hydrochloride polymer. Further, the monoallylamine hydrochloride polymer had a weight average molecular weight of 2,100 according to the measurement by the GPC method.

Further, the above monoallylamine hydrochloride polymer was measured for a water content with a Karl Fischer water content measuring apparatus (water content meter MKS-510, evaporator ADP-511S) supplied by Kyoto Denshisha. The measurement was carried out with a sample amount of 0.25 g at a temperature of 150° C. for an evaporation time of 20 minutes.

As a result, it was found that the water content in the polymer was 0.5% by weight or less. A commercially available solid monoallylamine hydrochloride polymer (Commercial Product No. PAA-HCl-3S, supplied by Nittobo) was also measured for a water content to show 5.17% by weight. These data show that the above-obtained polymer was anhydrous unlike a conventional product.

Example 2

Preparation of Monoallylamine Hydrochloride Polymer by Using Ethanol as Polymerization Medium A 300-milliliter four-necked round-bottom separable flask having a stirrer, a thermometer and a Dimroth reflux condenser (with a calcium tube in which silica gel is sealed) was charged 75.0 g (0.80 mol) of monoallylamine hydrochloride, 175 g of ethanol was added, and the monoallylamine hydrochloride was dissolved therein. An ethanol solution containing the monoallylamine hydrochloride at a monomer concentration of 30% by weight was maintained at 50° C., and 6.18 g (3.3 mol % based on the monomer) of MAIB was added as a radical polymerization initiator. Further, 24 hours and 48 hours after the polymerization was initiated, each of 6.18g of MAIB was added. The polymerization was carried out at 50° C. for a total time period of 120 hours. Each time when the polymerization initiator was added, heat generation was small, and the temperature was increased by 2° C. or smaller.

Then, a precipitate formed during the polymerization was recovered by filtration and dried under vacuum at 60° C. for 72 hours, to give 65.2 g (isolation yield 81%) of an anhydrous monoallylamine hydrochloride polymer in the form of a powder. Further, the monoallylamine hydrochloride polymer had a weight average molecular weight of 1,200 according to measurement by the GPC method.

Example 3

Preparation of Methanol Solution of Monoallylamine Polymer Free of Addition Salt A one-liter three-necked round-bottom flask having a stirrer, a thermometer and a reflux condenser was charged with 200.0 g (1.64 mol) of the monoallylamine hydrochloride polymer obtained in Example 1, 50 ml of methanol was added, and the monoallylamine hydrochloride polymer was dispersed therein. While the dispersion was stirred with cooling, 320.4 g of a methanol solution having a sodium methoxide concentration of 28% by weight (1.66 mol) was added little by little, and the mixture was allowed to react at room temperature for 1 hour.

Then, the mixture was stirred under heat at 50° C. overnight and then allowed to cool, and formed sodium chloride was removed, to give an absolute methanol solution of a free monoallylamine polymer. Methanol was distilled off from the above solution, then, n-propanol was added, a small amount of sodium chloride which precipitated was filtered off, to give an n-propanol solution of an anhydrous monoallylamine polymer. The solution was heated under reduced pressure to remove the n-propanol by distillation, to give a free monoallylamine polymer in the form of a solid.

Further, the above n-propanol solution was added to tetrahydrofuran to give a white solid which was remarkably well dispersed. The solid was recovered by filtration and dried under vacuum and heat to give a free monoallylamine polymer in the form of a white powder.

Conventionally, a free monoallylamine polymer is obtained only in the form of a solid mass, while it can be obtained in the form of a powder according to the above process of the present invention.

The polymer was measured for a water content according to the method described in Example 1, to show 0.5% by weight or less.

Figure 4:
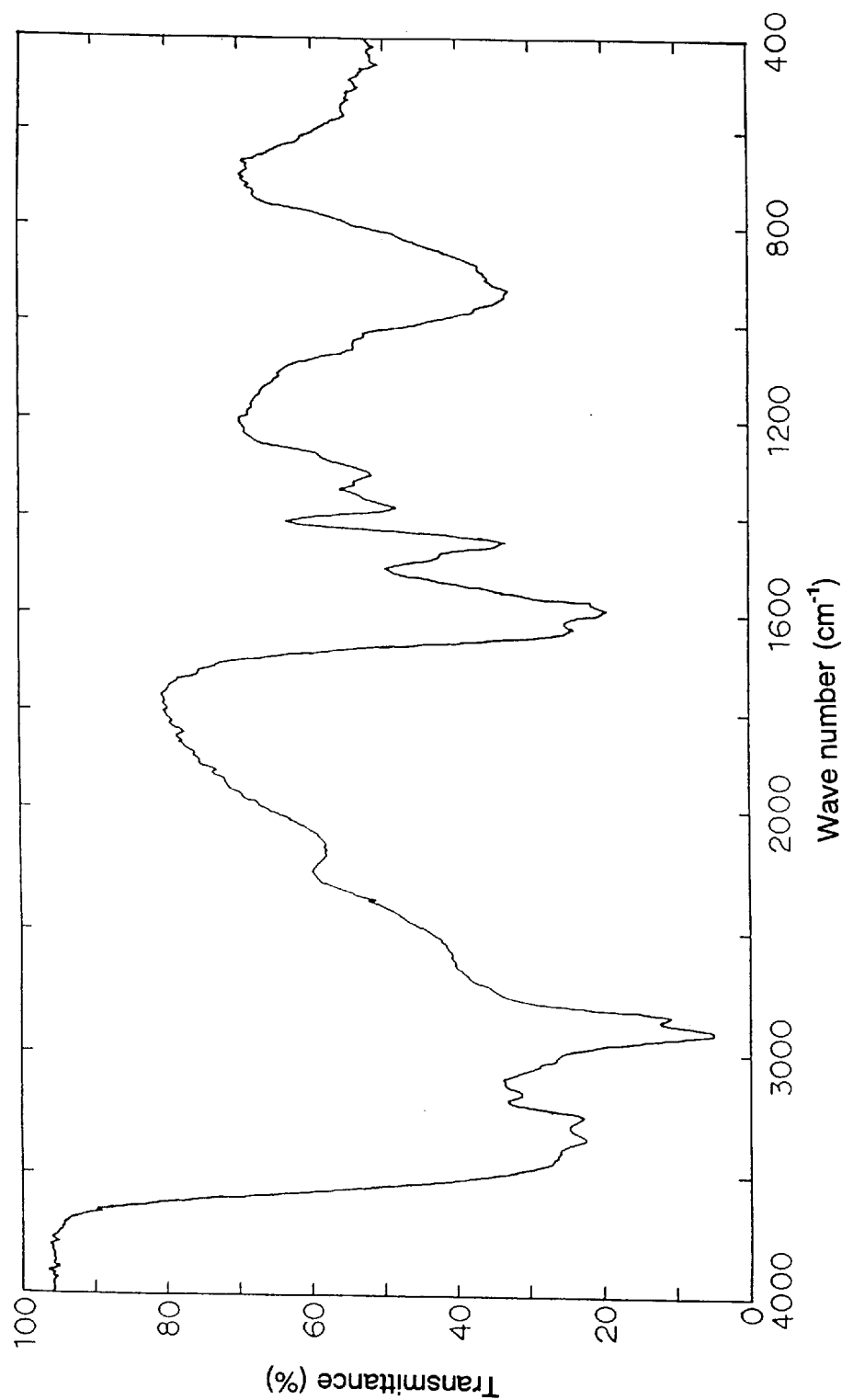
FIG. 4 is an IR spectrum of a free monoallylamine polymer obtained in Example 3.

FIG. 4 shows an IR spectrum of the above polymer.

Examples 4–11 and Comparative Examples 1–7

Preparation of Monoallylamine Hydrochloride Polymers Under Various Conditions

A 100-milliliter three-necked round-bottom flask having a stirrer, a thermometer and a reflux condenser was charged with 50 g of an organic solvent solution containing monoallylamine hydrochloride at a monomer concentration of 60% by weight, and the organic solvent solution was maintained at 60° C. A radical polymerization initiator (10 mol % based on the monomer) was divided into two portions, one portion was added when the polymerization was initiated and the other portion was added 24 hours after the polymerization was initiated. The polymerization was continued at 60° C. for a total time period of 72 hours.

After the polymerization was completed, the reaction mixture was added to about 100 ml of methanol, and a resultant precipitate was recovered by filtration and washed with methanol and dried under vacuum at 60° C. for 72 hours to give an anhydrous allylamine hydrochloride polymer.

Table 1 shows polymerization conditions (radical polymerization initiators and solvents used for polymerization) and polymerization results (isolation yields and weight average molecular weights).

TABLE 1

| | Radical polymerization initiator | Solvent for polymerization | Yield of polymer (%) | Weight average molecular weight |
|---|---|---|---|---|
| Ex. 4 | MAIB | MeOH | 89 | 2,700 |
| Ex. 5 | MAIB | EtOH | 87 | 2,900 |
| Ex. 6 | MAIB | NPA | 92 | 4,600 |
| Ex. 7 | MAIB | IPA | 91 | 3,600 |
| Ex. 8 | MAIB | DMF | 94 | 4,800 |
| Ex. 9 | MAIB | DMAc | 93 | 4,300 |
| Ex. 10 | MAIB | NMP | 91 | 3,600 |
| Ex. 11 | MAIB | DMSO | 63 | 8,200 |
| CEx. 1 | V-50 | MeOH | 33 | — |
| CEx. 2 | AIBN | MeOH | 0 | — |
| CEx. 3 | VA-088 | MeOH | 7 | — |
| CEx. 4 | t-BHP | MeOH | 7 | — |
| CEx. 5 | $H_2O_2$ | MeOH | 3 | — |
| CEx. 6 | BPO | MeOH | 0 | — |
| CEx. 7 | APS | MeOH | 27 | — |

Notes to Table 1:
Ex. = Example, CEx. = Comparative Example
MAIB: 2,2'-azobis(methyl 2-methylpropionate)
V-50: 2,2'-azobis(2-amidinopropane) hydrochloride
AIBN: Azobisisobutyronitrile
VA-088: 2,2'-azobis(2-methylpropionic acid amide)
t-BHP: tert-butylhydroperoxide
BPO: benzoyl peroxide
APS: ammonium persulfate
MeOH: methanol
EtOH: ethanol
NPA: n-propanol
IPA: isopropanol
DMF: N,N-dimethylformamide
DMAC: N,N-dimethylacetamide
NMP: N-methylpyrrolidone
DMSO: dimethyl sulfoxide

Examples 12–13

A 500-milliliter four-necked round-bottom separable flask having a stirrer, a thermometer and a Dimroth reflux condenser was charged with an organic solvent solution containing 159.23 g (1.5 mol) of monoallylamine 1/2 sulfate at a monomer concentration of 50% by weight or 25% by weight, and 5 mol %, based on the monomer, of MAIB was added, followed by polymerization at 55° C. for 72 hours. After the polymerization was completed, a reaction product was precipitated in methanol, and a precipitate was recovered by filtration to give a monoallylamine ½ sulfate polymer in the form of a powder. Table 2 shows the results.

TABLE 2

| | Monomer concentration (wt %) | Radical polymerization initiator | Solvent for polymerization | Yield of polymer (%) | weight average molecular weight |
|---|---|---|---|---|---|
| Ex. 12 | 50 | MAIB | MeOH | 94 | 1,600 |
| Ex. 13 | 25 | MAIB | EtOH | 83 | 1,800 |

Ex. = Example
Notes: For MAIB, MeOH and EtOH, see notes to Table 1.

Example 14

Preparation of Monoallylamine-methane Sulfonate Polymer

A one-liter four-necked round-bottom separable flask having a stirrer, a thermometer and a Dimroth reflux condenser was charged with 600 g of hexane and 114.18 g of monoallylamine, and 192.2 g of methanesulfonic acid was gradually dropwise added with cooling and stirring. A purified white precipitate was recovered by filtration and dried to quantitatively give a crystal of monoallylamine- methanesulfonate.

A 500-milliliter four-necked round-bottom separable flask having a stirrer, a thermometer and a Dimroth reflux condenser was charged with 153.19 g (1.0 mol) of the monoallylamine-methanesulfonate and 115 ml of DMSO, and a homogeneous monomer solution was prepared. To the solution was added 11.52 g (5 mol % of the monomer) of MAIB, and the monomer was polymerized at 55° C. for 72 hours. After the polymerization was completed, a reaction product was re-precipitated in isopropanol and a precipitate was recovered to give 151.66 g (isolation yield 99%) of a monoallylamine-methanesulfonate polymer in the form of a powder. The polymer was analyzed by GPC for a weight average molecular weight to show 3,600.

Example 15

Preparation of N,N-dimethylallylamine Hydrochloride Polymer by Using Ethanol as Polymerization Medium An ethanol solution containing 636.2 g (5.23 mol) of N,N-dimethylallylamine hydrochloride at a monomer concentration of 70% by weight was temperature-increased up to 60° C., 40.0 g (3.3 mol % based on the monomer) of MAIB was added as a radical polymerization initiator, and the monomer was polymerized at 60° C. with stirring. During the above addition, the solution showed almost no increase in temperature. Further, 40.0 g of MAIB was also added at each time of 24 hours, 48 hours and 72 hours after the polymerization was initiated, and the polymerization was carried out for a total time period of 120 hours.

After the polymerization was completed, a reaction mixture was added to a large excess of acetone. A formed solid was recovered by filtration and dried under vacuum at 45° C. for 24 hours to give 604.4 g (isolation yield 95%) of an N,N-dimethylallylamine hydrochloride polymer. The polymer was analyzed by GPC for a weight average molecular weight to show 900.

Figure 5:
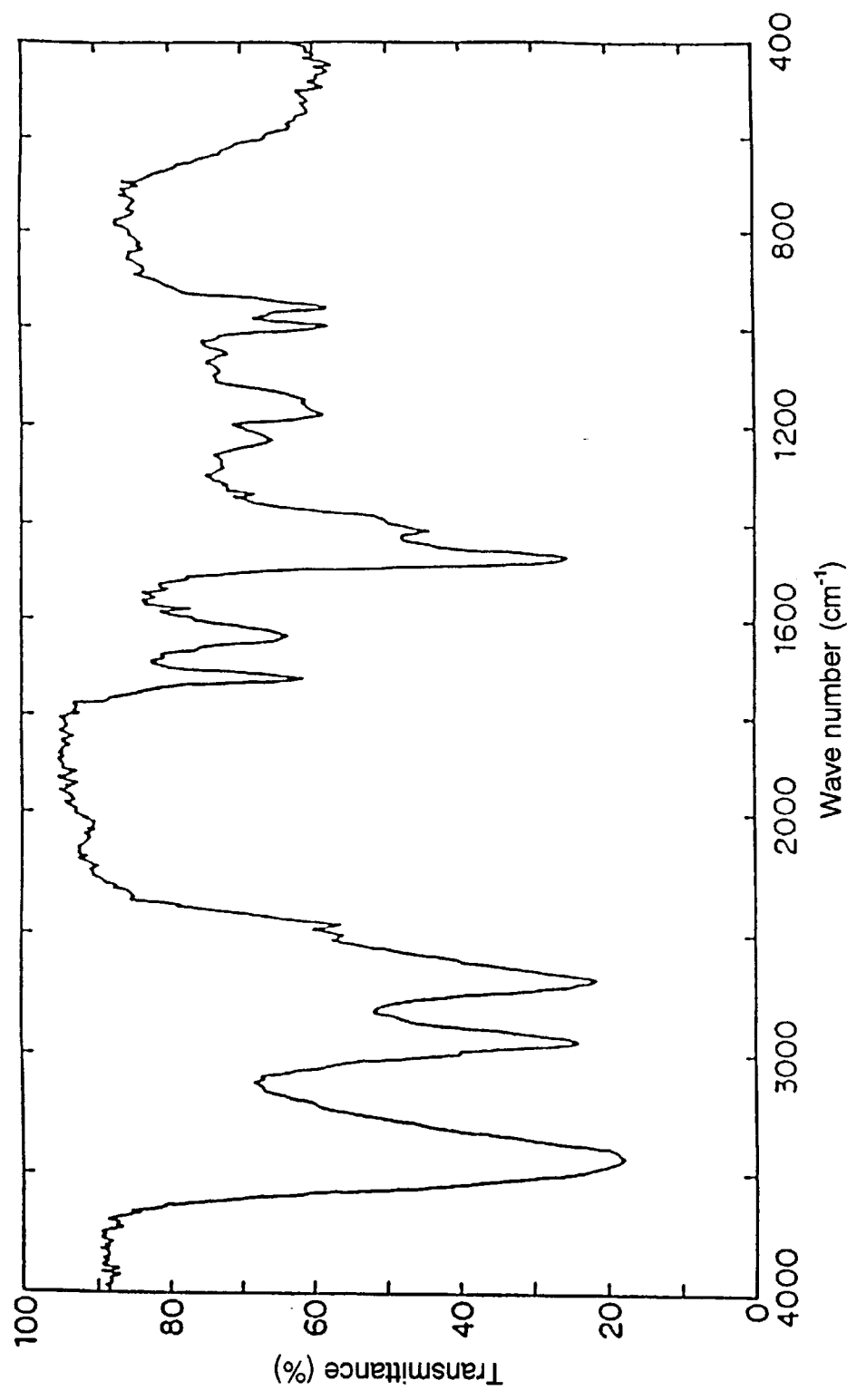
FIG. 5 is an IR spectrum of an N,N-dimethylallylamine hydrochloride polymer obtained in Example 15.
Figure 6:
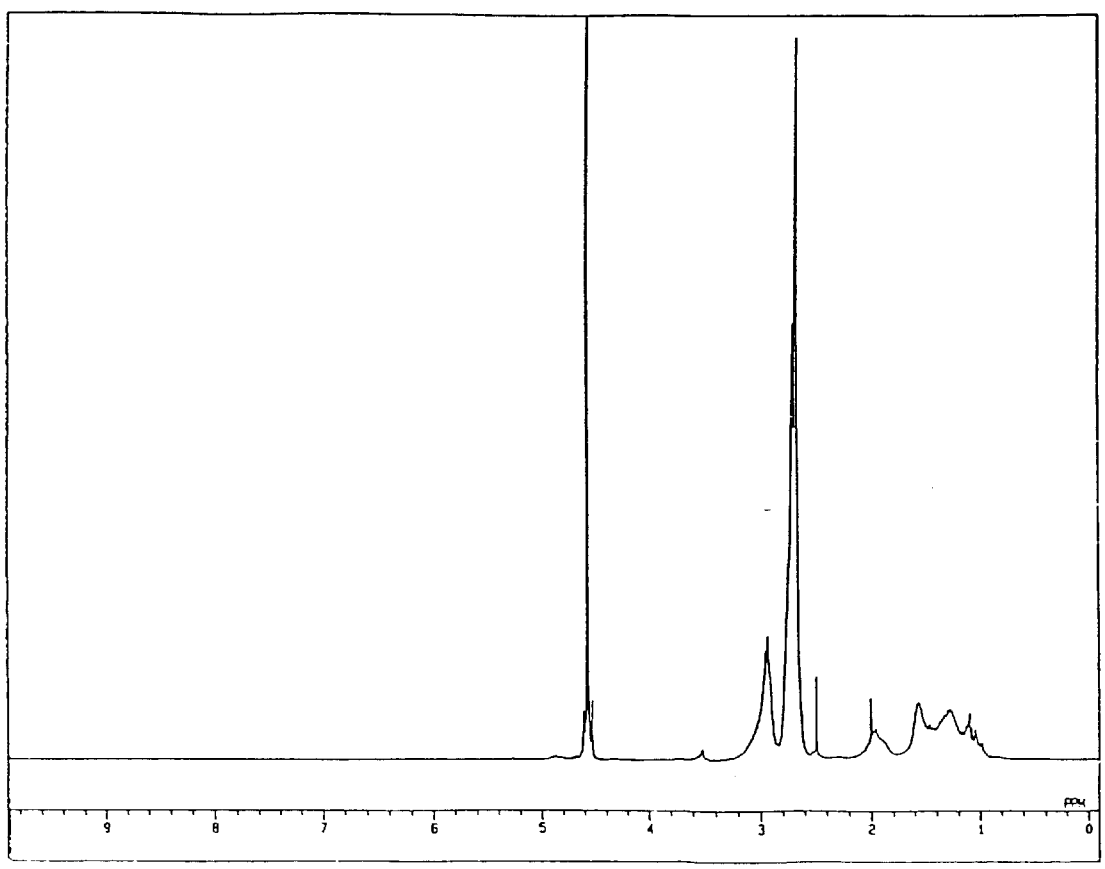
FIG. 6 is an NMR spectrum ($D_2O$ solvent) of the N,N-dimethylallylamine hydrochloride polymer obtained in Example 15.

FIGS. 5 and 6 show an IR spectrum and an NMR spectrum of the above polymer.

Example 16

Preparation of N,N-dimethylallylamine Hydrochloride Polymer by Using Methanol as Polymerization Medium A methanol solution containing 117.9 g (0.97 mol) of N,N-dimethylallylamine hydrochloride at a monomer concentration of 75% by weight was temperature-increased up to 50° C., 5.6 g (2.5 mol % based on the monomer) of MAIB was added as a radical polymerization initiator, and the monomer was polymerized at 60° C. Further, 5.6 g of MAIB was also added at each time of 24 hours, 48 hours, 72 hours and 96 hours after the polymerization was initiated, and the polymerization was carried out for a total time period of 168 hours.

After the polymerization was completed, a reaction mixture was treated nearly in the same manner as in Example 15, to give 81.4 g (isolation yield 69%) of an N,N-dimethylallylamine hydrochloride polymer. The polymer was analyzed by GPC for a weight average molecular weight to show 1,400.

Examples 17–26 and Comparative Examples 8–11

Preparation of N,N-dimethylallylamine Hydrochloride Polymers Under Various Conditions An organic solvent solution containing 30 g (0.247 mol) of N,N-dimethylallylamine hydrochloride was temperature-increased up to 60° C., then, a radical polymerization initiator was added when polymerization was initiated and at each time of 24 hours and 48 hours after the polymerization was initiated. The polymerization was carried out at 60° C. for a total time period of 72 hours.

After the polymerization was completed, a reaction mixture was added to an excess of acetone, a formed precipitate was recovered by filtration, and the precipitate was dried under vacuum at 55° C. for 72 hours or longer, to give an N,N-dimethylallylamine hydrochloride polymer. Table 3 shows polymerization conditions (monomer concentrations, radical polymerization initiators, amounts of the initiators, media for polymerization and temperatures for polymerization) and results (yields of isolated polymers and weight average molecular weights).

TABLE 3

|  | Monomer concentration | Radical initiator | Radical initiator (mol %) | Solvent for polymerization (weight ratio) | Polymerization temperature (° C.) | Yield of polymer (%) | Weight average molecular weight |
|---|---|---|---|---|---|---|---|
| Ex. 17 | 60 | MAIB | 15 | EtOH | 60 | 91 | 800 |
| Ex. 16 | 60 | MAIB | 7.5 | EtOH | 60 | 75 | 900 |
| Ex. 19 | 60 | MAIB | 15 | EtOH | 60 | 70 | 1,000 |
| Ex. 20 | 60 | MAIB | 15 | MeOH | 60 | 61 | 700 |
| Ex. 21 | 50 | MAIB | 15 | NPA | 60 | 92 | 800 |
| Ex. 22 | 40 | MAIB | 15 | IPA | 60 | 83 | 600 |
| Ex. 23 | 30 | MAIB | 15 | DMF | 60 | 96 | 900 |
| Ex. 24 | 40 | MAIB | 15 | DMSO | 60 | 95 | 1,100 |
| Ex. 25 | 27 | MAIB | 15 | DMAc/MeOH (7/1) | 60 | 92 | 700 |
| Ex. 26 | 27 | MAIB | 15 | NMP/MeOH (7/1) | 60 | 92 | 700 |
| CEx. 8 | 60 | v-50 | 15 | EtOH | 60 | 8 | 800 |
| CEx. 9 | 60 | AIBN | 15 | EtOH | 60 | 3 | 800 |
| CEx. 10 | 60 | t-BHP | 15 | EtOH | 60 | 25 | 500 |
| CEx. 11 | 60 | BPO | 15 | EtOH | 60 | 0 | — |

Ex. = Example, CEx. = Comparative Example
Notes: For MAIB, V-50, AIBN, t-BHP, BPO, EtOH, MeOH, NPA, IPA, DMF, DMSO, DMAc and NMP, see notes to Table 1.

Example 27

Preparation of N,N-dimethylallylamine Polymer Free of Addition Salt

A 500-milliliter three-necked separable flask having a stirrer, a thermometer and a reflux condenser was charged with the N,N-dimethylallylamine hydrochloride polymer (100.0 g, 0.822 mol) obtained in Example 15, 100 g of methanol was added, and the polymer was dissolved therein. While a mixture was stirred with cooling, 158.16 g of a methanol solution having a sodium methoxide concentration of 28% by weight (0.822 mol) was little by little added, and the mixture was allowed to react at room temperature for 1 hour. A precipitated crystal (sodium chloride) was filtered off, to give a filtrate which was a methanol solution of an anhydrous free N,N-diemthylallylamine polymer free of an addition salt. The precipitated crystal was found to be sodium chloride since no particular absorption was found in its IR spectrum.

Figure 7:
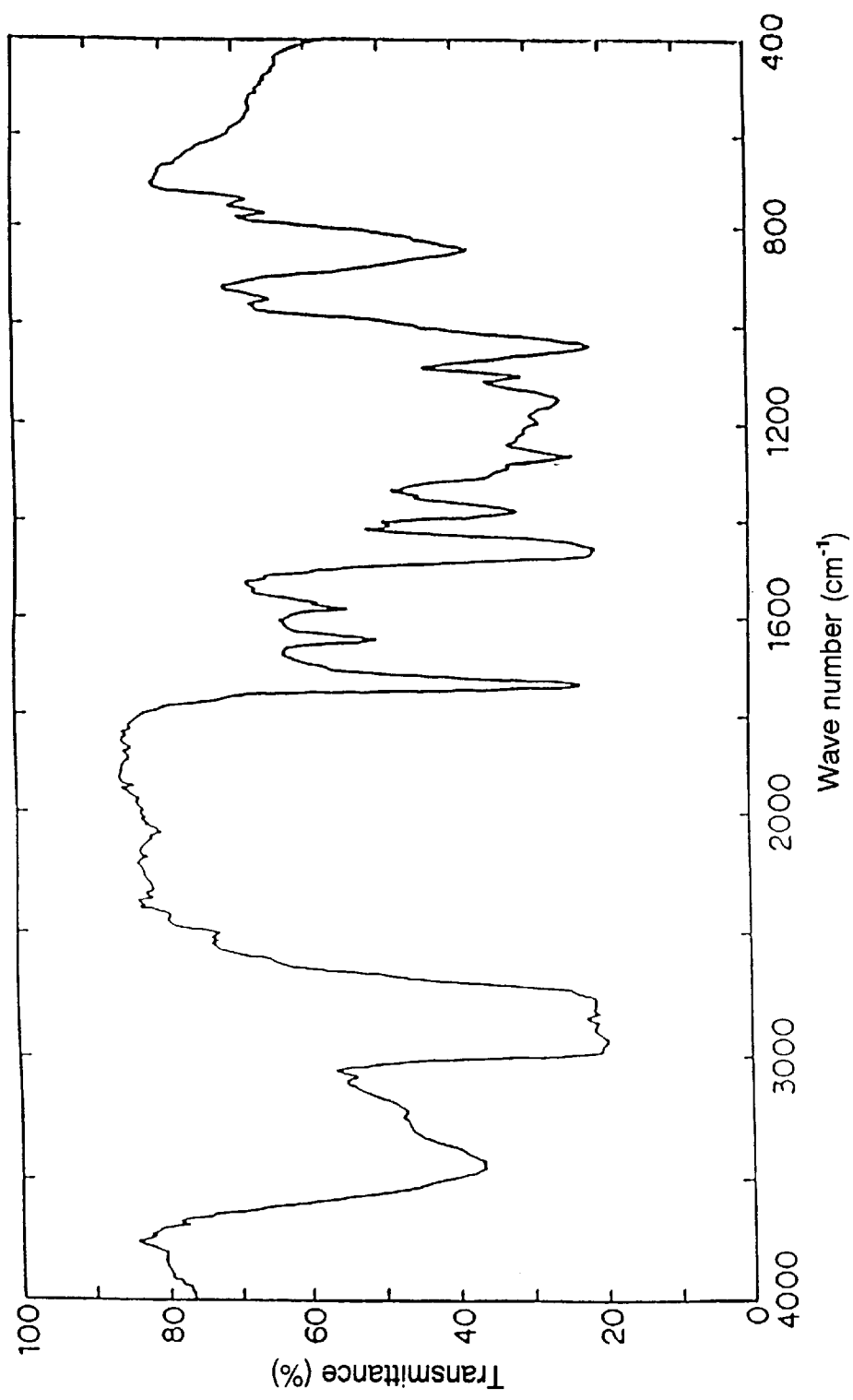
FIG. 7 is an IR spectrum of a free N,N-dimethylallylamine polymer obtained in Example 27.
Figure 8:
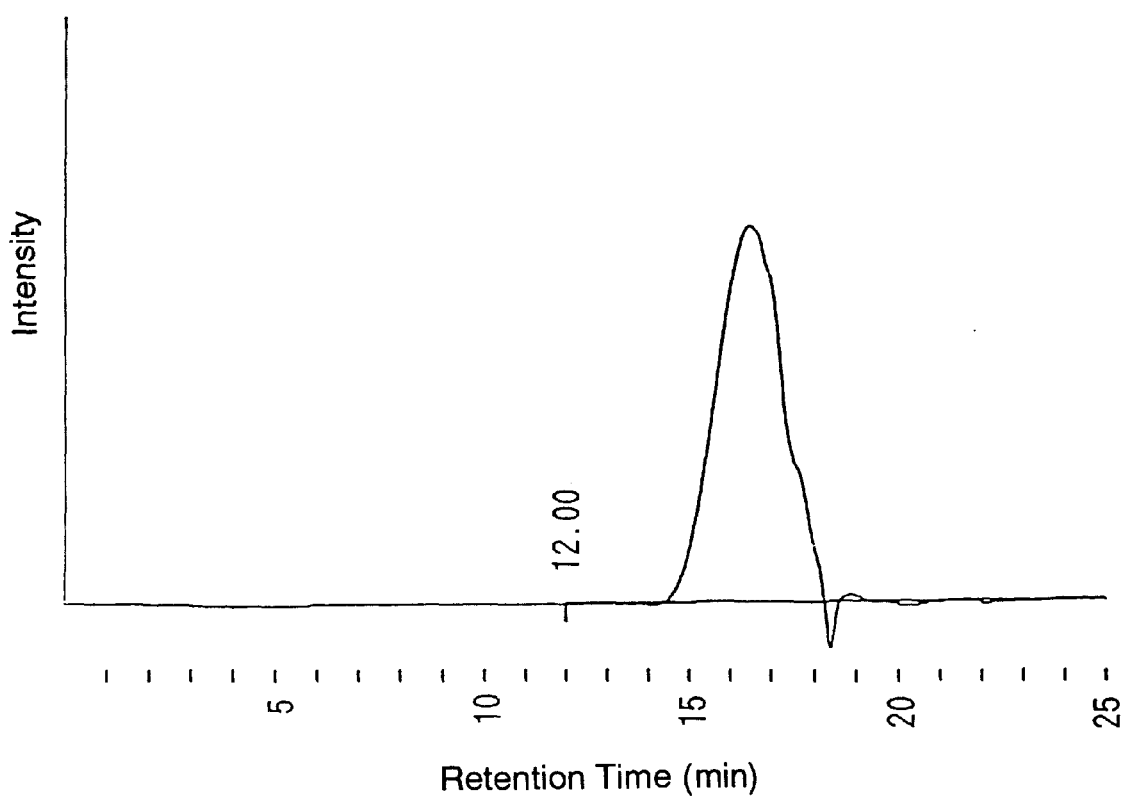
FIG. 8 is a molecular weight distribution of the free N,N-dimethylallylamine polymer obtained in Example 27, prepared by GPC.

The above filtrate was distilled under reduced pressure to give a residue which was an N,N-dimethylallylamine polymer free of the addition salt. FIG. 7 shows the IR spectrum of the polymer, and FIG. 8 shows GPC results thereof.

Example 28

Preparation of Copolymer from N,N-dimethylallylamine Hydrochloride and Monoallylamine Hydrochloride (Charging Molar Ratio 1:1)

A one-liter four-necked round-bottom separable flask having a stirrer, a thermometer and a Dimroth reflux condenser (with a calcium tube in which silica gel is sealed) was charged with an ethanol solution containing 273.0 g (2.25 mol) of N,N-dimethylallylamine hydrochloride and 210.0 g (2.25 mol) of monoallylamine hydrochloride at a total monomer concentration of 60% by weight, and while the ethanol solution was maintained at 55° C., 20.7 g (2.0 mol % based on the monomers) of MAIB was added as a radical polymerization initiator. Further, each of 31.1 g (3.0 mol % based on the monomers) of MAIB was also added at each time of 24 hours, 48 hours and 72 hours after the polymerization was initiated. 96 Hours after the polymerization was initiated, the polymerization temperature was increased to 60° C. The polymerization was carried out for a total time period of 166 hours.

Figure 9:
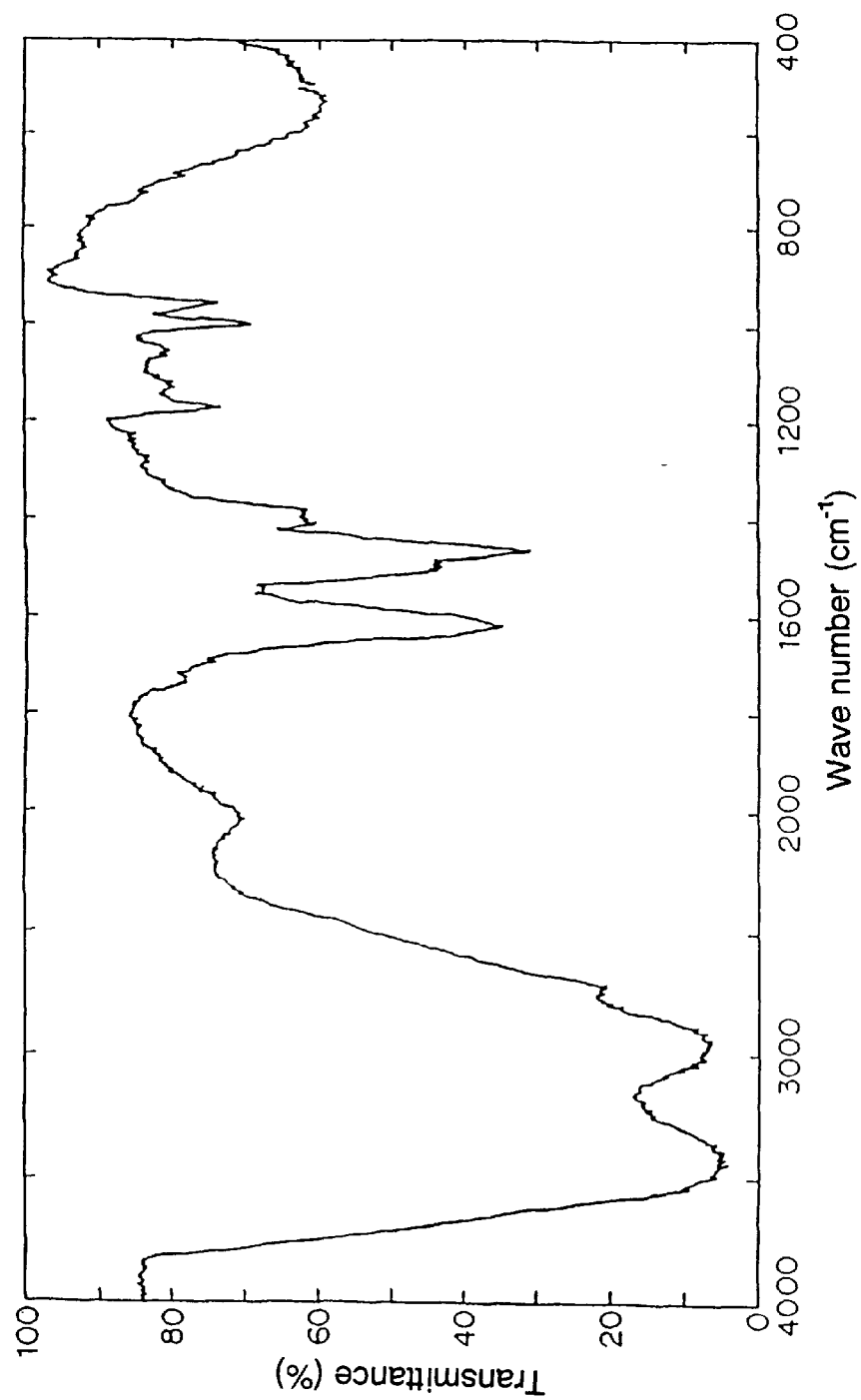
FIG. 9 is an IR spectrum of a copolymer obtained from N,N-dimethylallylamine hydrochloride and monoallylamine hydrochloride (charging molar ratio 1:1) in Example 28.
Figure 10:
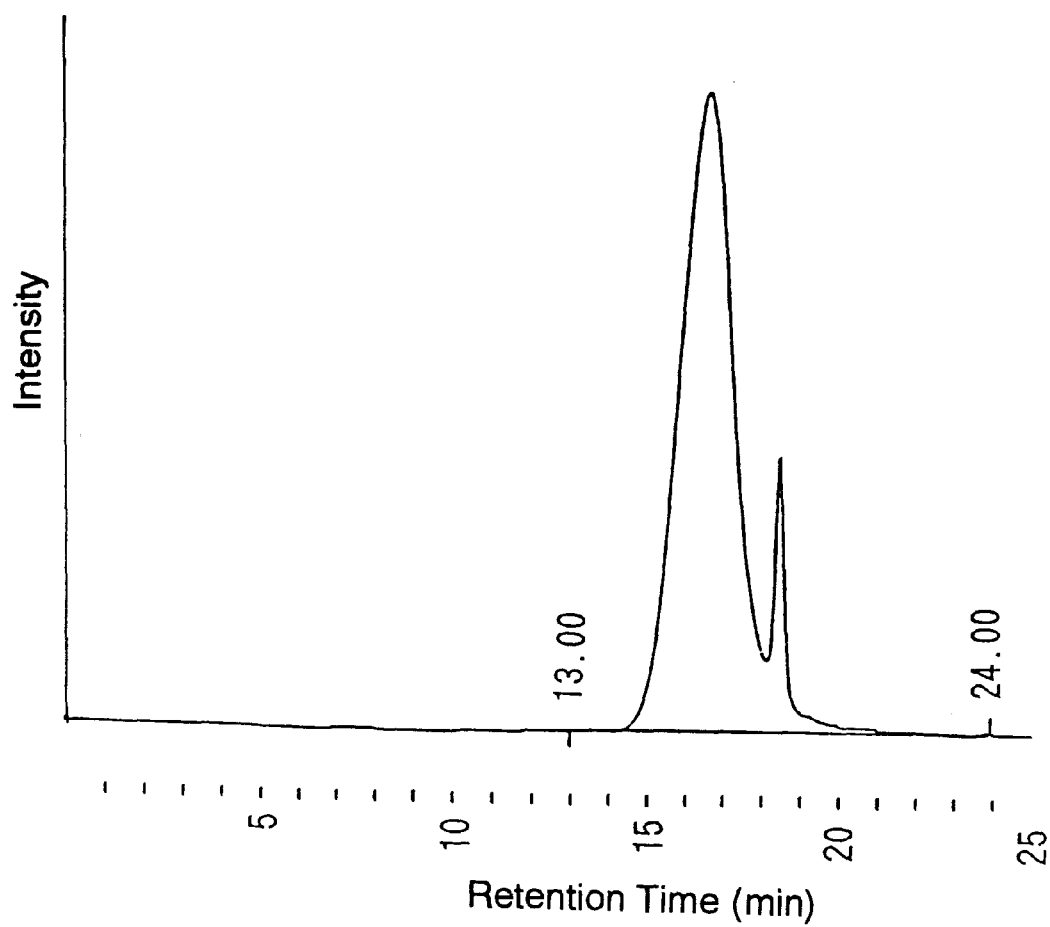
FIG. 10 is a molecular weight distribution of the copolymer obtained from N,N-dimethylallylamine hydrochloride and monoallylamine hydrochloride (charging molar ratio 1:1) in Example 28, prepared by GPC.

After the polymerization was completed, the reaction mixture was added to 6 liters of acetone, and a precipitated crystal was recovered by filtration and then dried under vacuum at 50° C. for 24 hours to give 473.3 g (isolation yield 98%) of an anhydrous N,N-dimethylallylamine hydrochloride/monoallylamine hydrochloride copolymer (charging molar ratio 1:1). FIGS. 9 and 10 show an IR spectrum and GPC results of the above copolymer.

The IR spectrum supports that the obtained polymer was an N,N-dimethylallylamine hydrochloride/monoallylamine hydrochloride copolymer since no absorption caused by CH=CH at 910 cm$^{-1}$ was found in the IR spectrum shown. The copolymer was also measured for a weight average molecular weight by GPC to show 700.

Example 29

Preparation of Copolymer from N,N-dimethylallylamine Hydrochloride and Monoallylamine Hydrochloride (Charging Molar Ratio 1:3)

398.6 Grams (isolation yield 98%) of an anhydrous N,N-dimethylallylamine hydrochloride/monoallylamine hydrochloride copolymer (charging molar ratio 1:3) was obtained in the same manner as in Example 28 except that the amount of N,N-dimethylallylamine was changed to 126.1 g (1 mol) and that the amount of monoallylamine hydrochloride was changed to 280.7 g (3 mol). The copolymer was also measured for a weight average molecular weight by GPC to show 800.

Example 30

Preparation of Copolymer from N,N-dimethylallylamine Hydrochloride and Monoallylamine Hydrochloride (Charging Molar Ratio 3:1)

422.5 Grams (isolation yield 92%) of an anhydrous N,N-dimethylallylamine hydrochloride/monoallylamine hydrochloride copolymer (charging molar ratio 3:1) was obtained in the same manner as in Example 28 except that the amount of N,N-dimethylallylamine was changed to 364.8 g (3 mol) and that the amount of monoallylamine hydrochloride was changed to 93.5 g (1 mol). The copolymer was also measured for a weight average molecular weight by GPC to show 650.

Example 31

Preparation of Addition-salt-free Copolymer from N,N-Dimethylallylamine Hydrochloride and Monoallylamine Hydrochloride (Charging Molar Ratio 1:1)

A 300-milliliter four-necked separable flask having a stirrer, a thermometer and a reflux condenser was charged with 54.1 g (0.5 mol in terms of a monomer unit) of the N,N-dimethylallylamine hydrochloride/monoallylamine hydrochloride copolymer obtained in Example 28, 50 ml of methanol was added, and the copolymer was dispersed therein. While a mixture was stirred with cooling, 97.1 g of a methanol solution having a sodium methoxide concentration of 28% by weight (0.5 mol) was little by little added, and then, the mixture was allowed to react at room temperature for 1 hour. A precipitated crystal was filtered off, to give a filtrate which was a methanol solution of a free N,N-diemthylallylamine/monoallylamine copolymer free of addition salts. The precipitated crystal was found not to be a polymer but to be sodium chloride since no particular absorption was found in its IR spectrum.

Figure 11:
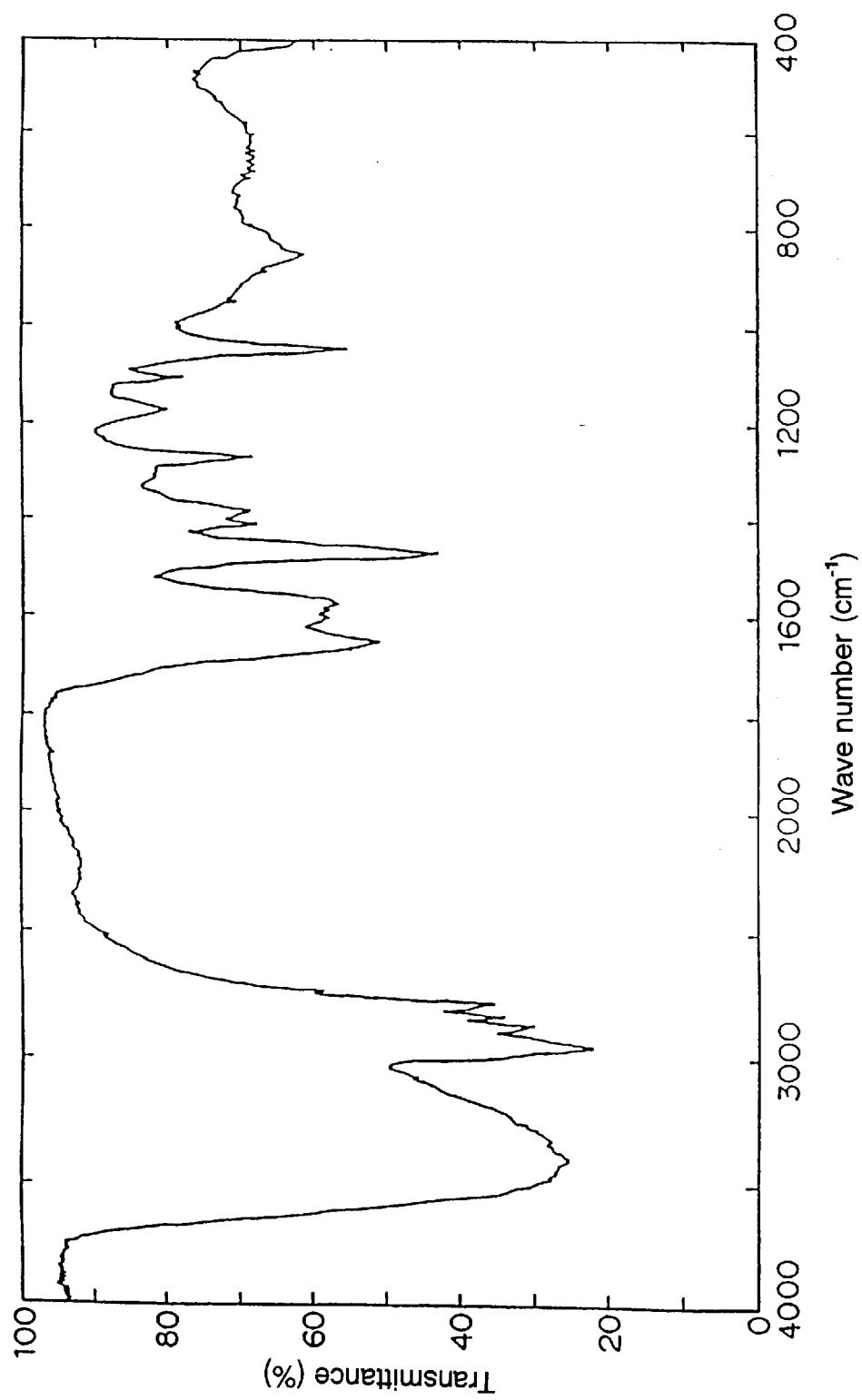
FIG. 11 is an IR spectrum of a copolymer obtained from free N,N-dimethylallylamine and monoallylamine (charging molar ratio 1:1) in Example 31.
Figure 12:
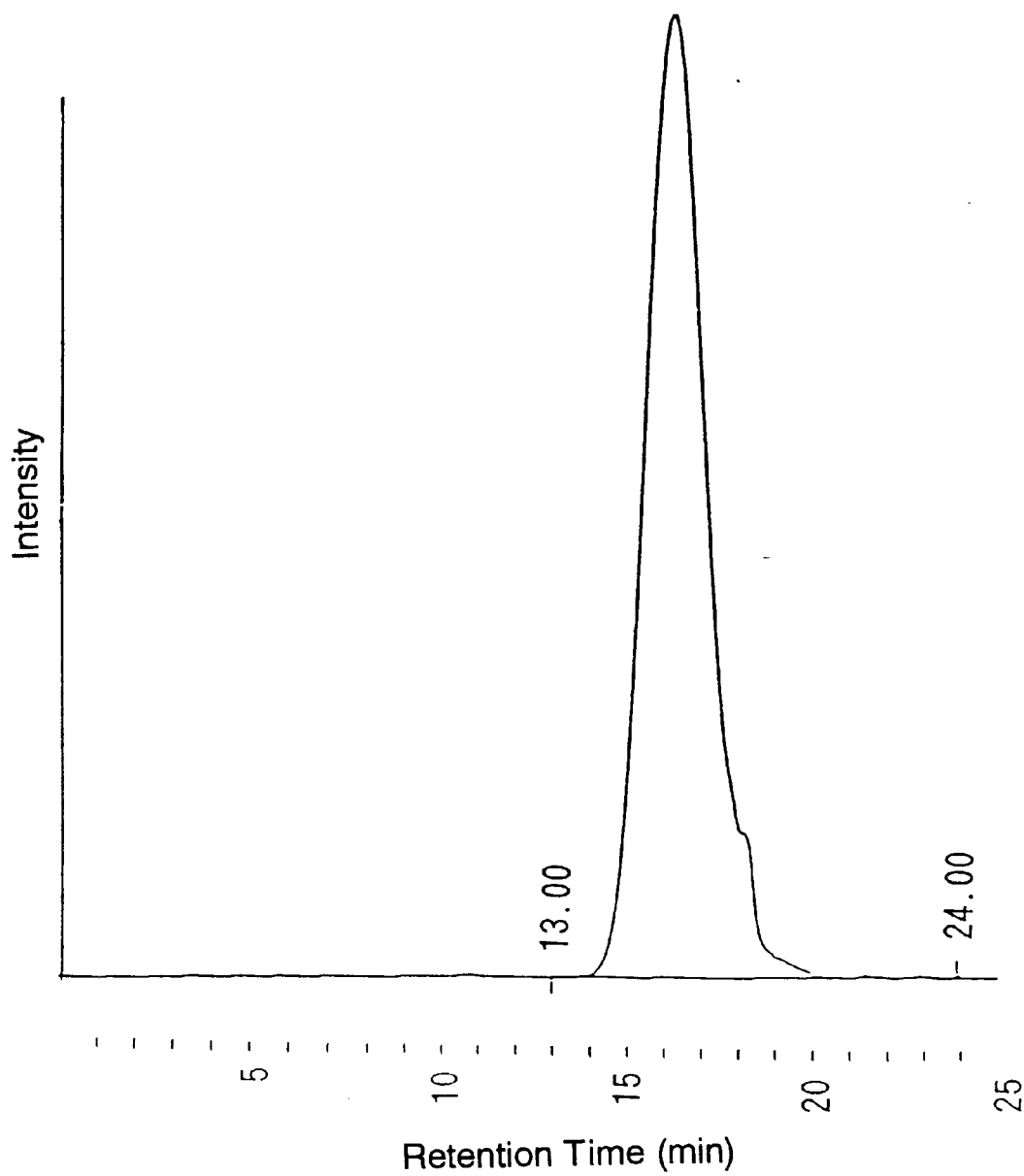
FIG. 12 is a molecular weight distribution of the copolymer obtained from free N,N-dimethylallylamine and monoallylamine (charging molar ratio 1:1) in Example 31, prepared by GPC.

FIGS. 11 and 12 show an IR spectrum and GPC results of free N,N-diemthylallylamine/monoallylamine copolymer (charging molar ratio of 1:1) free of addition salts.

Examples 32–35 and Comparative Examples 12–14

Preparation of Copolymer from N,N-dimethylallylamine Hydrochloride and Monoallylamine Hydrochloride Under Various Conditions A 100-milliliter four-necked round-bottom separable flask having a stirrer, a thermometer and a Dimroth reflux condenser (with a calcium tube in which silica gel is sealed) was charged with an organic solvent containing 30.4 g (0.25 mol) of N,N-dimethylallylamine hydrochloride and 23.4 g (0.25 mol) of monoallylamine hydrochloride, and while a mixture was maintained at 60° C., a radical polymerization initiator (a total of 15 mol % based on the monomers) was divided into three portions and added thereto when polymerization was initiated and at each time of 12 hours and 24 hours after the polymerization was initiated. The polymerization was carried out at 55° C. for a total time period of 72 hours.

After the polymerization was completed, a reaction mixture was added to a large amount of acetone, a formed precipitate was recovered by filtration, washed with acetone and the precipitate was dried under vacuum at 50° C. for 24 hours, to give an anhydrous N,N-dimethylallylamine hydrochloride/monoallylamine hydrochloride copolymer. Table 4 shows polymerization conditions (concentrations of total monomers, radical polymerization initiators and solvents for polymerization) and results (yields of isolated polymers and weight average molecular weights).

TABLE 4

| | Monomer concentration (wt %) | Radical initiator | Solvent for polymerization | Yield of polymer (%) | Weight average molecular weight |
|---|---|---|---|---|---|
| Ex. 32 | 60 | MAIB | ethanol | 88 | 700 |
| Ex. 33 | 70 | MAIB | ethanol | 95 | 900 |
| Ex. 34 | 80 | MAIB | ethanol | 91 | 1,100 |
| Ex. 35 | 60 | MAIB | methanol | 85 | 800 |
| CEx. 12 | 60 | V-50 | ethanol | 6 | 700 |
| CEx. 13 | 60 | BPO | ethanol | 1 | 700 |
| CEx. 14 | 60 | AIBN | ethanol | 5 | 700 |

Ex. = Example,
CEx. = Comparative Example
Notes: For MAIB, V-50, BPO and AIBN, see notes to Table 1.

Test Example 1

Solubility of N,N-dimethylallylamine Hydrochloride/Monoallylamine Hydrochloride Copolymer in Various solvents 0.1 Gram of each of the copolymers obtained in Examples 28 to 30 was studied on their solubility (at 30° C.) in water and organic solvents (5 ml each). An N,N-dimethylallylamine hydrochloride homopolymer (polymer having a weight average molecular weight of 600, obtained by polymerization of N,N-dimethylallylamine hydrochloride in ethanol in the presence of MAIB as a catalyst) as Referential Example 1 and a monoallylamine hydrochloride homopolymer (PAA·HCl-3S, supplied by Nitto Boseki, weight average molecular weight approximately 10,000) as Referential Example 2 were also studied on their solubility in the same manner as above. Table 5 shows the results.

TABLE 5

|  | Example | | | Comparative Example | |
| --- | --- | --- | --- | --- | --- |
| Polymer | 26 | 29 | 30 | 1 | 2 |
| Monomer ratio (DMMA · HCl/MAA · HCl) | 1/1 | 1/3 | 3/1 | 1/0 | 0/1 |
| Water | soluble | soluble | soluble | soluble | soluble |
| Methanol | soluble | soluble | soluble | soluble | insoluble |
| Diethylene glycol | soluble | soluble | soluble | soluble | insoluble |
| Ethylene glycol | soluble | soluble | soluble | soluble | soluble |
| Acetone | insoluble | insoluble | insoluble | insoluble | insoluble |
| Ethanol | insoluble | insoluble | soluble | soluble | insoluble |
| Isopropanol | insoluble | insoluble | insoluble | soluble | insoluble |
| Formamide | soluble | soluble | soluble | soluble | soluble |
| DMF | insoluble | insoluble | insoluble | insoluble | insoluble |

Notes:
DMAA · HCl: N,N-dimethylallylamine hydrochloride
MAA· HCl: monoallylamine hydrochloride
DMF: N,N-dimethylformamide As shown in Table 5, concerning solubility in organic solvents, the copolymer of the present invention has properties between the monoallylamine hydrochloride homopolymer and the N,N-dimethylallylamine hydrochloride homopolymer.

Examples 36–43

Preparation of N-monoalkylallylamine Hydrochloride Polymer Under Various Conditions A one-liter four-necked round-bottom separable flask having a stirrer, a thermometer and a Dimroth reflux condenser was charged with an organic solvent solution containing N-monoalkylallylamine hydrochloride (3.0 mol), and the organic solvent solution was maintained at 55° C. To the organic solvent solution was added 17.23 g (2.5 mol % based on the monomer) of MAIB. Further, 17.23 g of MAIB was added at each time of 24 hours, 48 hours and 72 hours after the polymerization was initiated. The polymerization was carried out at 55° C. for a total time period of 120 hours.

After the polymerization was completed, the reaction mixture was poured into a re-precipitating solvent such as acetone or the like, and a formed precipitate was recovered by filtration and washed with the same re- precipitating solvent and then dried under vacuum at 50° C. for 24 hours, to give an anhydrous N-monoalkylallylamine hydrochloride polymer.

TABLE 6

|  | Monomer | Monomer concentration (wt %) | Solvent for polymerization | Yield of polymer (%) | Weight average molecular weight |
| --- | --- | --- | --- | --- | --- |
| Ex. 36 | MMAA · HCl | 50 | MeOH | 81 | 1,700 |
| Ex. 37 | MMAA · HCl | 50 | EtOH | 95 | 1,600 |
| Ex. 38 | MMAA · HCl | 50 | DMF | 98 | 3,900 |
| Ex. 39 | MMAA · HCl | 50 | DMSO | 96 | 6,100 |
| Ex. 40 | MEAA · HCl | 50 | MeOH | 70 | 1,300 |
| Ex. 41 | MEAA · HCl | 50 | EtOH | 86 | 1,110 |
| Ex. 42 | MEAA · HCl | 34 | DMF/MeOH | 65 | 900 |
| Ex. 43 | MEAA · HCl | 34 | DMSO | 81 | 2,500 |

Ex. = Example
Notes:
MMAA · HCl: N-monomethylallylamine hydrochloride
MEAA · HCl: N-monoethylallylamine hydrochloride
For MeOH, EtOH, DMF and DMSO, see notes to Table 1.

Figure 13:
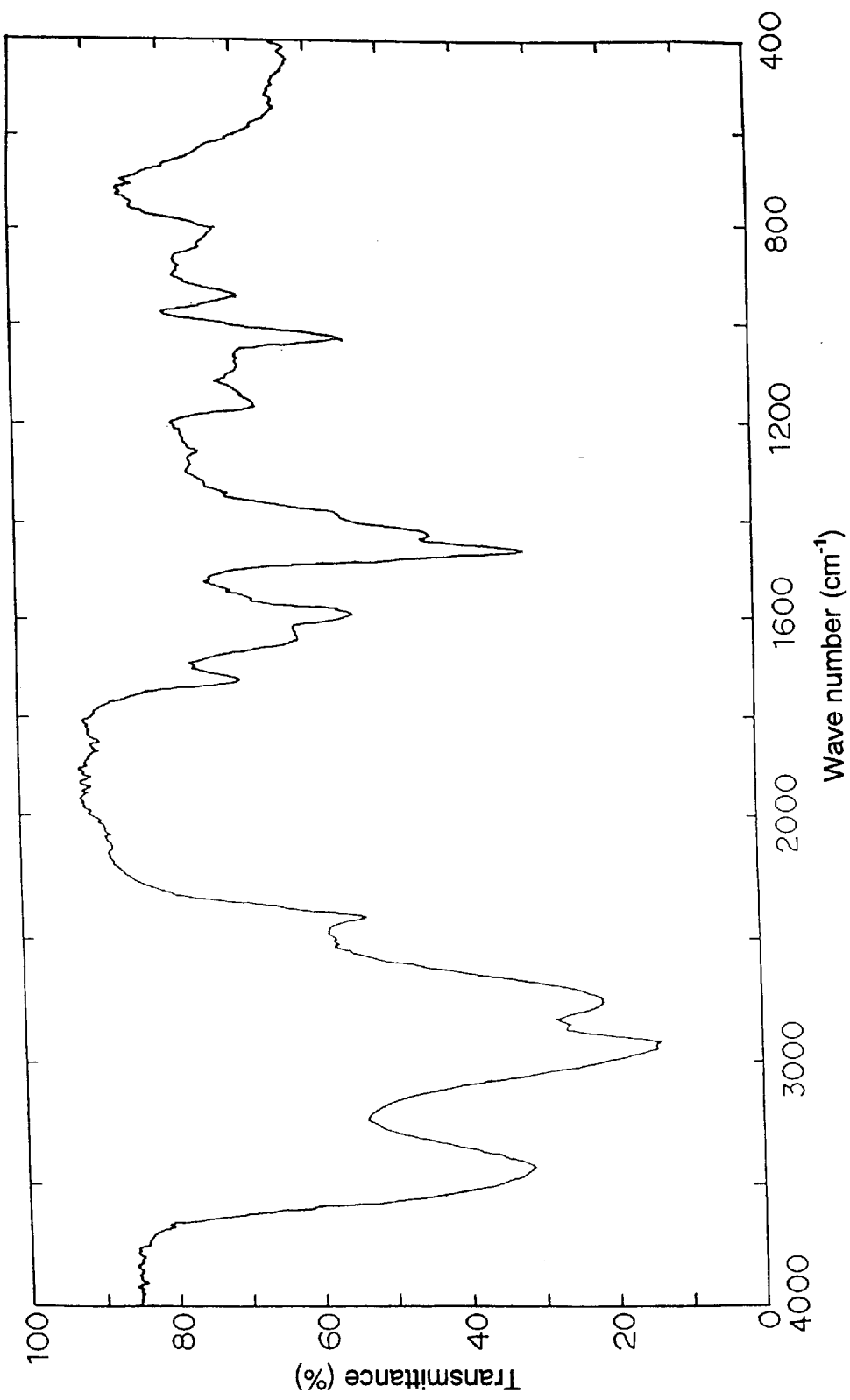
FIG. 13 is an IR spectrum of an N-monothylallylamine hydrochloride polymer obtained in Example 36.
Figure 14:
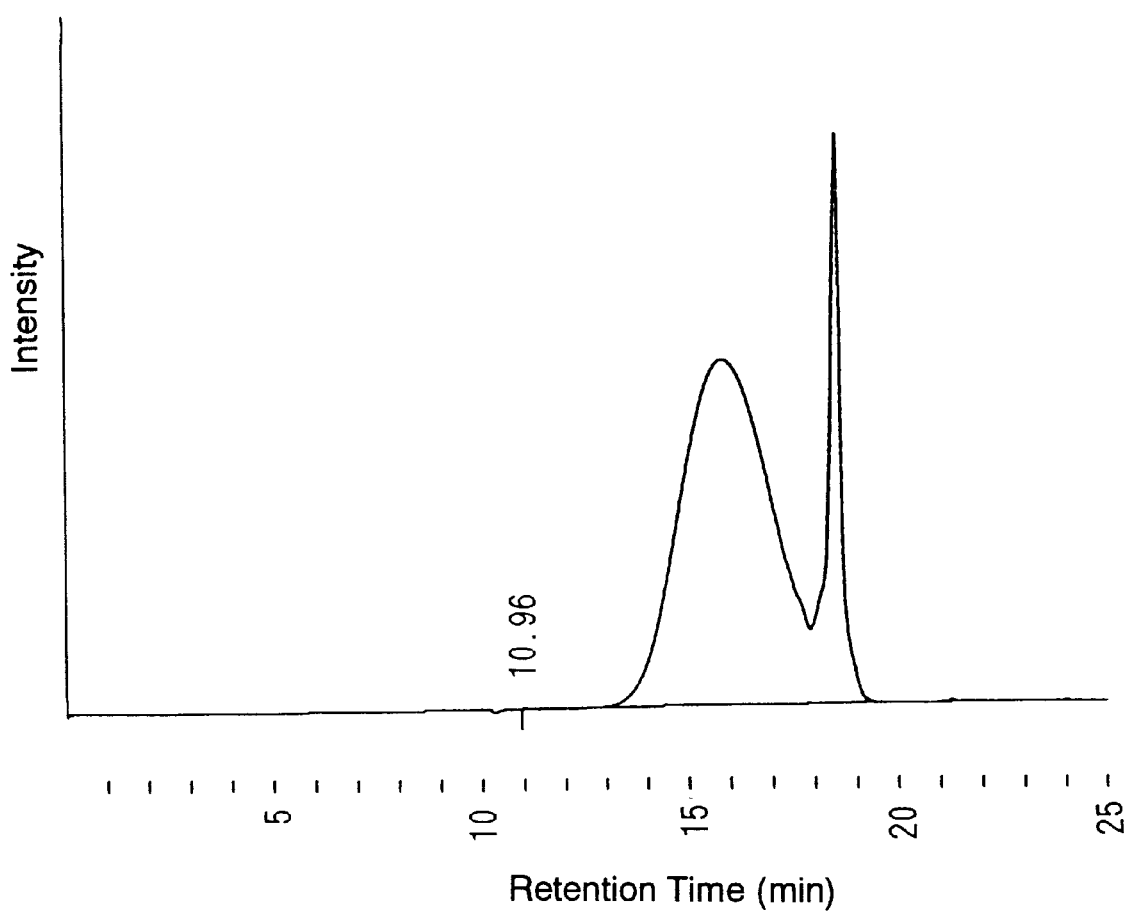
FIG. 14 is a molecular weight distribution of the N-monomethylallylamine hydrochloride polymer obtained in Example 36, prepared by GPC.

FIGS. 13 and 14 show an IR spectrum and GPC results of the N-monomethylallylamine hydrochloride (reprecipitating solvent: acetone) obtained in Example 36. The IR spectrum supports that the obtained polymer was an N-monoalkylallylamine hydrochloride polymer since the IR spectrum showed no absorption caused by CH=CH at a wavenumber of 910 cm$^{-1}$.

Examples 44–47

Preparation of Diallylamine Salt Copolymer

A one-liter four-necked round-bottom separable flask having a stirrer, a thermometer and a Dimroth reflux condenser was charged with a methanol solution containing hydrochloride or quaternary ammonium salt of diallylamine (3.0 mol) at a monomer concentration of 50% by weight, and the methanol solution was maintained at 55° C. To the methanol solution was added 17.23 g (2.5 mol % based on the monomer) of MAIB was added. Further, 17.23 g of MAIB was added at each time of 24 hours, 48 hours and 72 hours after the polymerization was initiated. The polymerization was carried out for a total time period of 120 hours.

After the polymerization was completed, the reaction mixture was added to isopropanol, and a formed precipitate was recovered by filtration and washed with isopropanol and then dried under vacuum at 50° C. for 24 hours, to give an anhydrous N-diallylamine hydrochloride or quaternary ammonium salt polymer. Table 7 shows the results.

TABLE 7

|  | Diallylamine | Yield of polymer | Weight average molecular weight |
| --- | --- | --- | --- |
| Example 44 | HOEDAA · HCl | Qauntitative | 4,400 |
| Example 45 | DAA · HCl | Qauntitative | 7,500 |
| Example 46 | MDAA · HCl | Qauntitative | 5,000 |
| Example 47 | DADMAC | Qauntitative | 8,100 |

Notes:
HOEDAA · HCl: N-hydroxyethyldiallylamine hydrochloride
DAA · HCl: diallylamine hydrochloride
MDAA · HCl: N-methyldiallylamine hydrochloride
DADMAC: diallyldimethylammonium chloride Examples 48–55

Preparation of Diallylamine Salt/Monoallylamine Salt Copolymer

Anhydrous monoallylamine hydrochloride/diallylamine salt copolymers were obtained in the same manner as in Examples 44 to 47 except that the diallylamine salt (3.0 mol) was replaced with a mixture of monoallylamine hydrochloride (1.5 mol) and diallylamine salt (1.5 mol). Table 8 shows the results.

TABLE 8

|  | Mono-allylamine | Diallylamine | Concentration of total monomers (wt %) | Initiator (mol %) | Yield of polymer (%) | Weight average molecular weight |
|---|---|---|---|---|---|---|
| Ex. 48 | MAA · HCl | HOEDAA · HCl | 52 | 8.6 | 87 | 4,400 |
| Ex. 49 | MAA · HCl | DAA · HCl | 50 | 8.6 | 96 | 4,000 |
| Ex. 50 | MAA · HCl | MDAA · HCl | 51 | 8.4 | 73 | 3,900 |
| Ex. 51 | MAA · HCl | DADMAC | 52 | 8.5 | 82 | 5,800 |
| Ex. 52 | DMAA · HCl | HOEDAA · HCl | 54 | 8.3 | 65 | 2,300 |
| Ex. 53 | DMAA · HCl | DAA · HCl | 52 | 8.4 | 63 | 2,100 |
| Ex. 54 | DMAA · HCl | MDAA · HCl | 53 | 8.3 | 67 | 2,300 |
| Ex. 55 | DMAA · HCl | DADMAC | 54 | 8.3 | 68 | 3,600 |

Notes:
MAA · HCl: monoallylamine hydrochloride
DMAA · HCl: N,N-dimethylallylamine hydrochloride
For HOEDAA.HCl, DAA.HCl, MDAA.HCl and DADMAC, see notes to Table 7.

Test Example 2

Solubility Test 0.1 Gram of each of the polymers obtained in Examples 44 to 55 was studied on their solubility (at 30° C.) in water and organic solvents (5 ml each). Table 9 shows the results.

TABLE 9

| | Example | | | | | |
|---|---|---|---|---|---|---|
| Polymer | 44 | 45 | 46 | 47 | 48 | 49 |
| Water | A | A | A | A | A | A |
| Methanol | A | A | A | A | A | A |
| Diethylene glycol | A | A | A | A | A | A |
| Ethylene glycol | A | A | A | A | A | A |
| Acetone | B | B | B | B | B | B |
| Ethanol | swollen | B | A | B | B | B |
| Isopropanol | B | B | A | B | B | B |
| Formamide | A | A | A | A | A | A |
| Dimethylformamide | B | B | B | B | B | B |

TABLE 9-continued

| | Example | | | | | |
|---|---|---|---|---|---|---|
| | 50 | 51 | 52 | 53 | 54 | 55 |
| Water | A | A | A | A | A | A |
| Methanol | A | A | A | A | A | A |
| Diethylene glycol | A | A | A | A | B | B |
| Ethylene glycol | A | A | A | A | A | A |
| Acetone | B | B | B | B | B | B |
| Ethanol | B | A | A | swollen | A | A |
| Isopropanol | B | B | B | B | B | A |
| Formamide | A | A | A | A | A | A |
| Dimethylformamide | B | B | B | B | B | B |

A = soluble, B = Insoluble

Examples 56–58

Preparation of Monoalkylallylamine Copolymer

Monoalkylallylamine copolymers were obtained in the same manner as in Examples 44 to 47 except that the diallylamine salt (3.0 mol) was replaced with a mixture of monoallyl or diallylamine hydrochloride (1.5 mol) and monoalkylallylamine hydrochloride (1.5 mol). Table 10 shows the results.

TABLE 10

|  | Monoallyl or diallylamine | Monoalkylallylamine | Solvent | Concentration of total monomers (wt %) | Initiator (mol %) | Yield of polymer (%) | Weight average molecular weight |
|---|---|---|---|---|---|---|---|
| Ex. 56 | MAA · HCl | MMAA · HCl | DMSO | 51 | 4.9 | 90 | 6,000 |
| Ex. 57 | MAA · HCl | MEAA · HCl | DMF | 52 | 5.1 | 89 | 2,800 |
| Ex. 56 | DAA · HCl | MMAA · HCl | MeOH | 51 | 4.8 | 87 | 3,700 |

Notes:
MAA · HCl: monoallylamine hydrochloride
DAA · HCl: diallylamine hydrochloride
MMAA · HCl: N-monomethylallylamine hydrochloride
MEAA · HCl: N-monoethylallylamine hydrochloride
For MeOH, DMF and DMSO, see notes to Table 1.

According to the present invention, allylamine polymers including homopolymers and copolymers of addition salts of monoallylamine, N,N-dialkylallylamine, N-monoalkylallylamine and diallylamine can be easily produced in organic solvents at high yields, and the process of the present invention can be advantageously applied to industrial production since no particularly difficult procedures are required. Further, when a water-free organic solvent is used in the present invention, an anhydrous allylamine addition salt polymer or a free allylamine polymer free of water can be easily produced. The allylamine polymer obtained according to the present invention is therefore useful for use in fields of various fine chemicals.

What is claimed is:

1. A process for the production of an N,N-dialkylallylamine polymer, which comprises polymerizing an addition salt of an N,N-dialkylallylamine in a medium mainly containing an organic solvent in the presence of at least one radical polymerization initiator selected from an azo compound of the general formula (I):

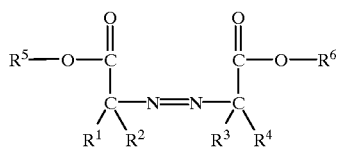

(I)

wherein each of $R^1$ to $R^6$ is independently a hydrocarbon group, provided that $R^1$ and $R^2$ may bond to each other to form a ring and that $R^3$ and $R^4$ may bond to each other to form a ring, and each of $R^5$ and $R^6$ is independently an alkyl group, and an azo compound of the general formula (II),

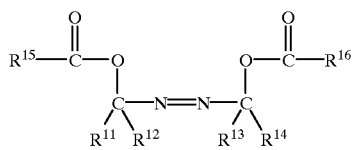

(II)

wherein each of $R^{11}$ to $R^{14}$ is independently a hydrocarbon group, provided that $R^{11}$ and $R^{12}$ may bond to each other to form a ring and that $R^{13}$ and $R^{14}$ may bond to each other to form a ring, and each of $R^{15}$ and $R^{16}$ is independently a hydrogen atom or an alkyl group.

2. The process of claim 1, wherein the radical polymerization initiator is 2,2'-azobis(methyl 2-methylpropionate).

3. The process of claim 1 or 2, wherein the N,N-dialkylallylamine addition salt is homopolymerized.

4. The process of claim 1 or 2, wherein the N,N-dialkylallylarmine addition salt and an addition salt of at least one allylamine, selected from monoallylamine, an N,N-dialkylallylamine and a diallylamine, are copolyermerized.

5. The process of claim 1 or 2, wherein the N,N-dialkylallylarnine addition salt is an addition salt of N,N-dialkylallylamine of the general formula (III),

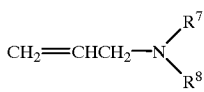

(III)

wherein each of $R^7$ and $R^8$ is independently an alkyl group having 1 to 10 carbon atoms.

6. A process for the production of an N,N-dialkylallylamine polymer having an average molecular weight of 600 to 1400, which comprises polymerizing an addition salt of an N,N-dialkylallylamine in a medium mainly containing an organic solvent in the presence of at least one radical polymerization initiator selected from an azo compound of the general formula (I):

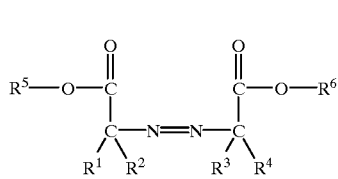

(I)

wherein each of $R^1$ to $R^6$ is independently a hydrocarbon group, provided that $R^1$ and $R^2$ may bond to each other to form a ring and that $R^3$ and $R^4$ may bond to each other to form a ring, and each of $R^5$ and $R^6$ is independently an alkyl group, and an azo compound of the general formula (II),

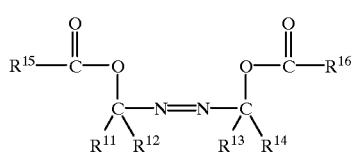

(II)

wherein each of $R^{11}$ to $R^{14}$ is independently a hydrocarbon group, provided that $R^{11}$ and $R^{12}$ may bond to each other to form a ring and that $R^{13}$ and $R^{14}$ may bond to each other to form a ring, and each of $R^{15}$ and $R^{16}$ is independently a hydrogen atom or an alkyl group.

7. A process for the production of an N,N-dialkylallylamine/allylamine copolymer, which comprises polymerizing an addition salt of N,N-dialkylallylamine of the general formula (III),

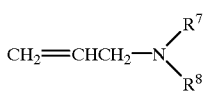

(III)

wherein each of $R^7$ and Rs is independently an alkyl group having 1 to 10 carbon atoms, and an addition salt of allylamine in a medium mainly containing an organic solvent in the presence of at least one radical polymerization initiator selected from an azo compound of the general formula (I), (I)

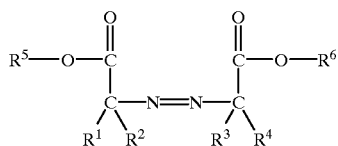

wherein each of $R^1$ to $R^4$ is independently a hydrocarbon group, provided that $R^1$ and $R^2$ may bond to each other to form a ring and that $R^3$ and $R^4$ may bond to each other to form a ring, and each of $R^5$ and $R^6$ is independently an alkyl group, and an azo compound of the general formula (II), (II)

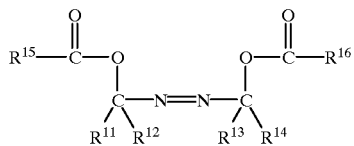

wherein each of $R^{11}$ to $R^{14}$ is independently a hydrocarbon group, provided that $R^{11}$ and $R^{12}$ may bond to each other to form a ring and that $R^{13}$ and $R^{14}$ may bond to each other to form a ring, and each of $R^{15}$ and $R^{16}$ is independently a hydrogen atom or an alkyl group.

8. A process for the production of an N,N-dialkylallylamine polymer, which comprises polymerizing an addition salt of N,N-dialkylallylamine of the general formula (III), (III)

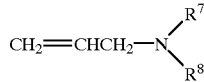

wherein each of $R^7$ and $R^8$ is independently an alkyl group having 1 to 10 carbon atoms, in a medium mainly containing an organic solvent in the presence of at least one radical polymerization initiator selected from an azo compound of the general formula (I), (I)

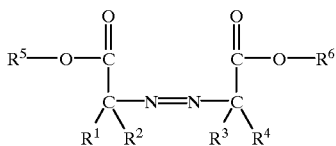

wherein each of $R^1$ and $R^4$ is independently a hydrocarbon group, provided that $R^1$ and $R^2$ may bond to each other to form a ring and that $R^3$ and $R^4$ may bond to each other to form a ring, and each of $R^5$ and $R^6$ is independently an alkyl group, and an azo compound of the general formula (II), (II)

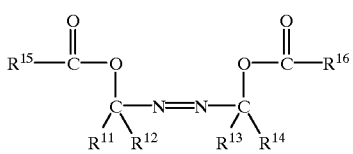

wherein each of $R^{11}$ to $R^{14}$ is independently a hydrocarbon group, provided that $R^{11}$ and $R^{12}$ may bond to each other to form a ring and that $R^{13}$ and $R^{14}$ may bond to each other to form a ring, and each of $R^{15}$ and $R^{16}$ is independently a hydrogen atom or an alkyl group.

* * * * *